Feb. 16, 1965  H. J. FINDLEY  3,169,349
GEAR FINISHING APPARATUS
Filed Jan. 12, 1961  10 Sheets-Sheet 1
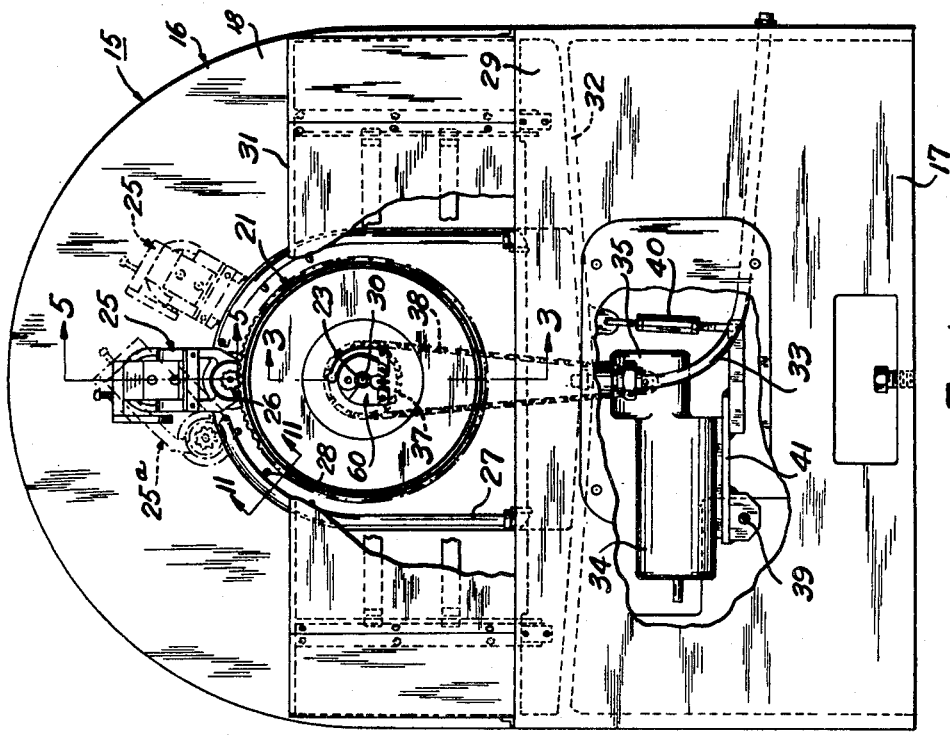
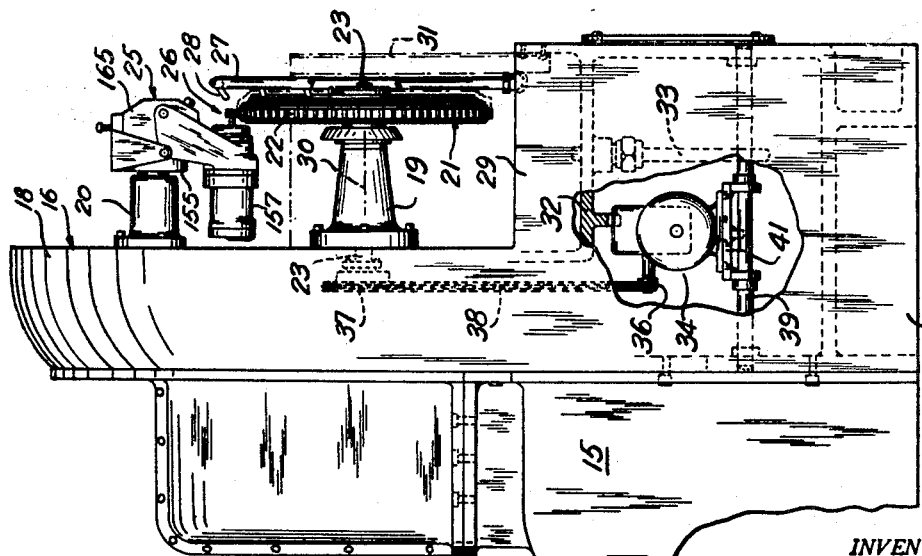
INVENTOR.
HOWARD J. FINDLEY
BY Hudson, Boughton,
Williams, David & Hoffman
ATTORNEYS

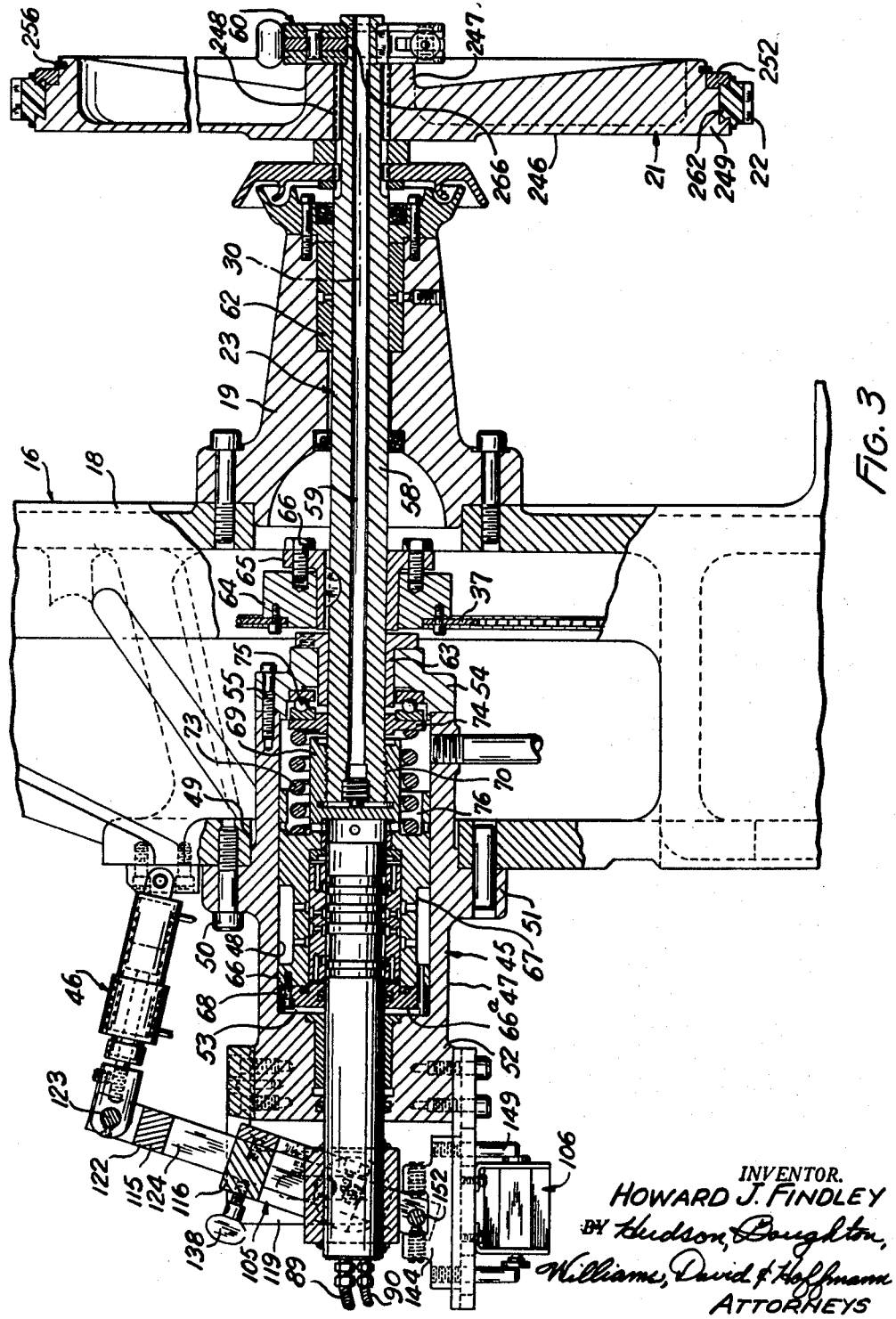

INVENTOR.
HOWARD J. FINDLEY
BY Hudson, Boughton,
Williams, David & Hoffman
ATTORNEYS Feb. 16, 1965 H. J. FINDLEY 3,169,349
GEAR FINISHING APPARATUS
Filed Jan. 12, 1961 10 Sheets-Sheet 4

INVENTOR.
HOWARD J. FINDLEY
BY Hudson, Coughton,
Williams, David & Hoffman
ATTORNEYS

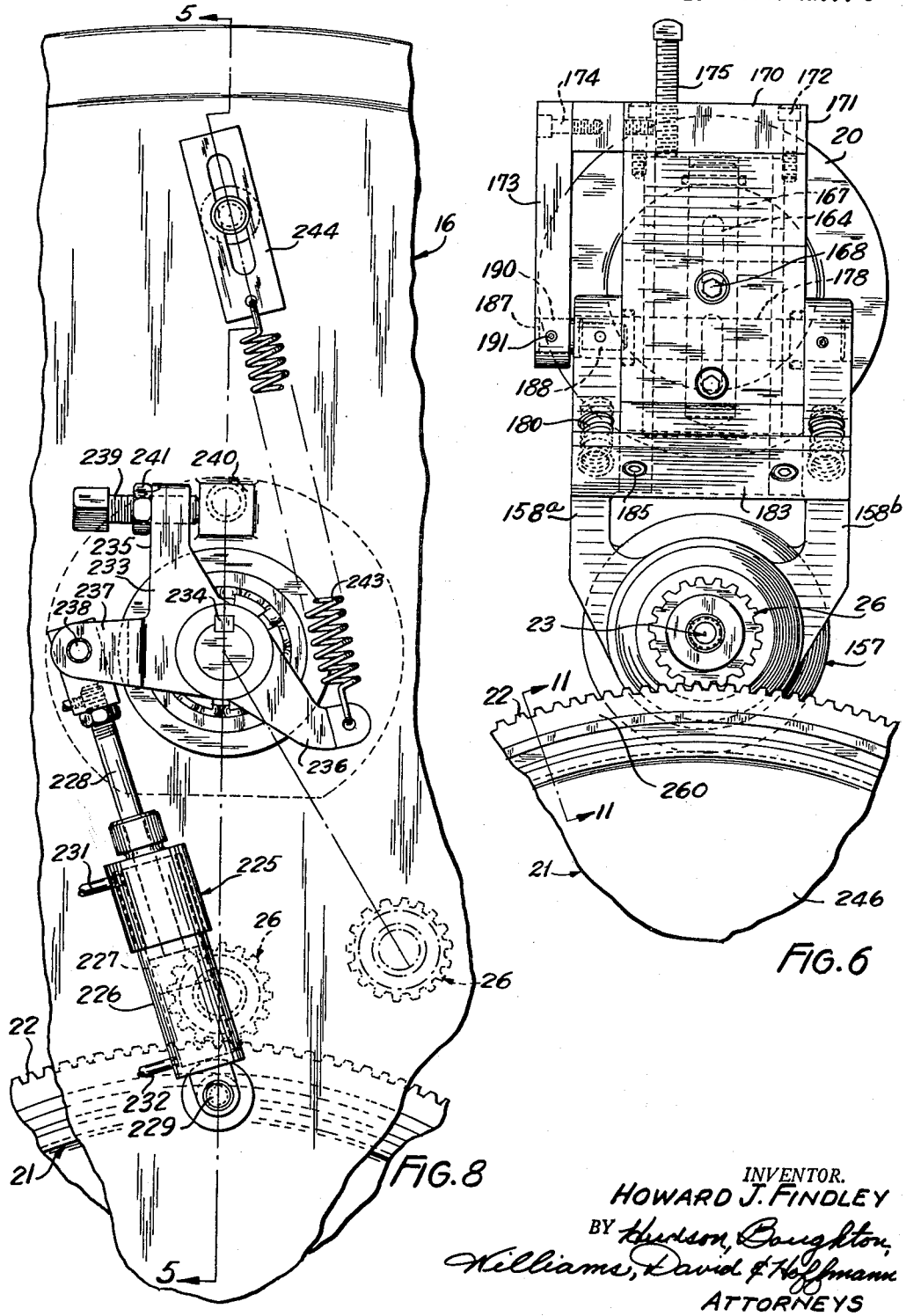

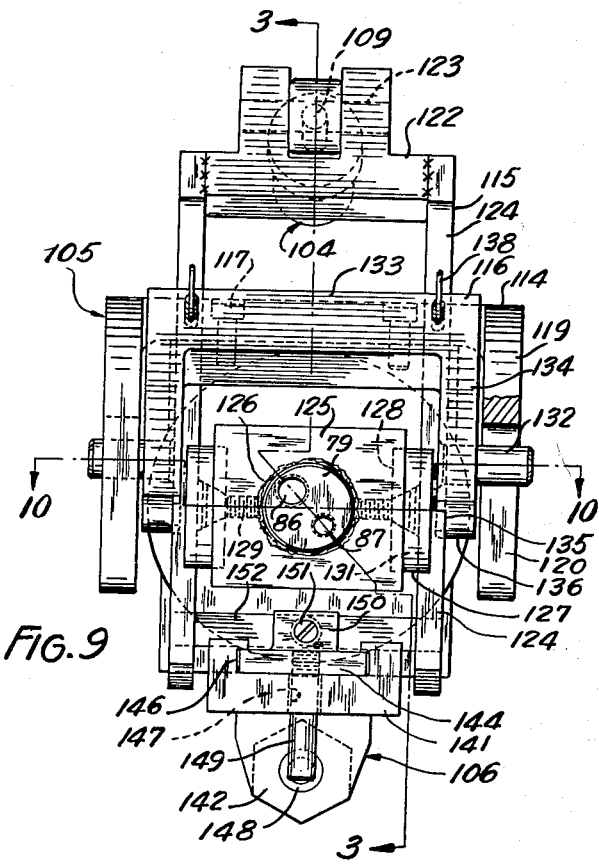

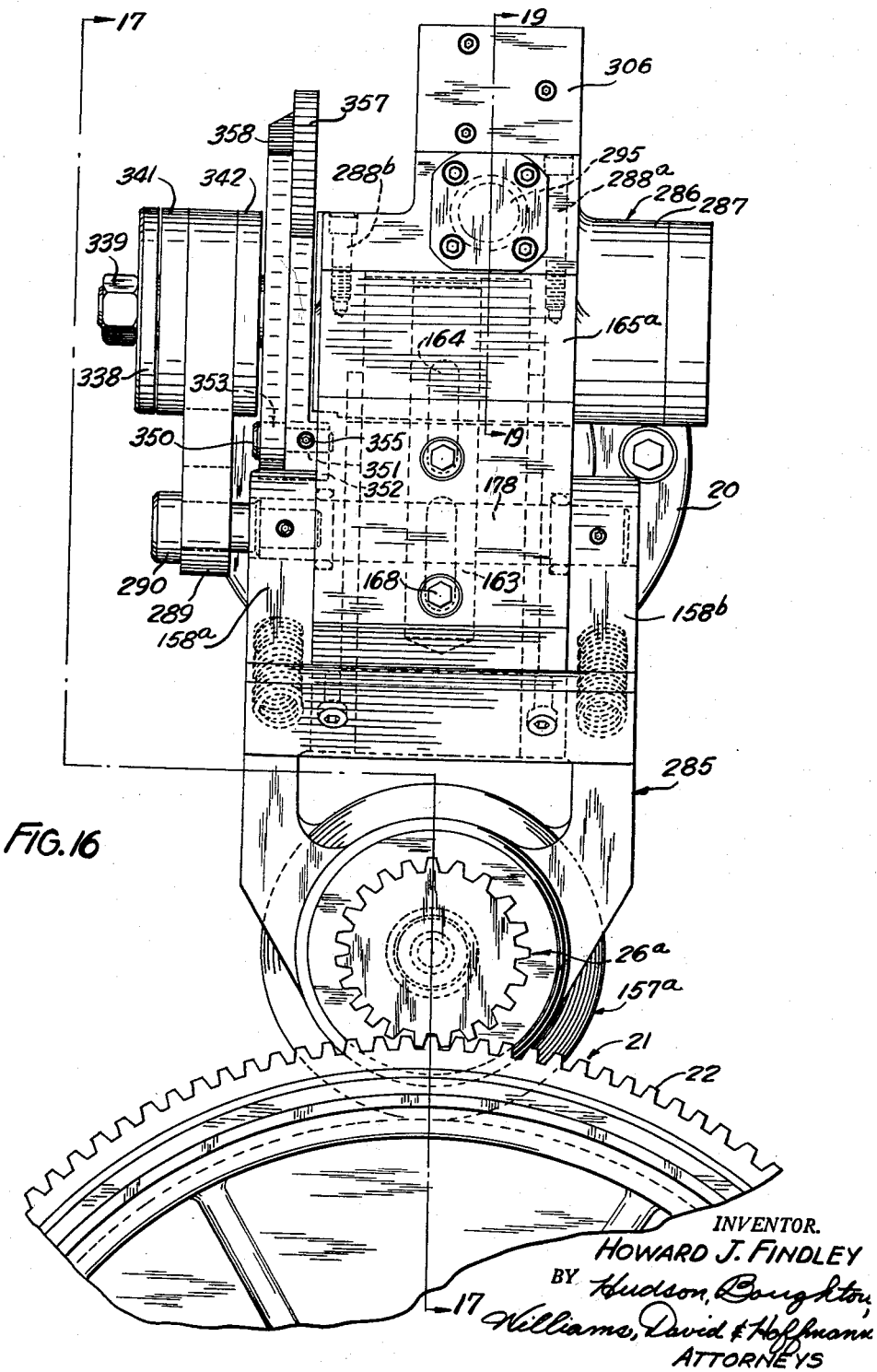

Feb. 16, 1965 H. J. FINDLEY 3,169,349
GEAR FINISHING APPARATUS
Filed Jan. 12, 1961 10 Sheets-Sheet 10

INVENTOR.
HOWARD J. FINDLEY
BY
ATTORNEYS

United States Patent Office 3,169,349
Patented Feb. 16, 1965

3,169,349
GEAR FINISHING APPARATUS
Howard J. Findley, Cleveland, Ohio, assignor to Textron
Inc., Providence, R.I., a corporation of Rhode Island
Filed Jan. 12, 1961, Ser. No. 82,228
28 Claims. (Cl. 51—52)

This invention relates to finishing apparatus for the abrasive finishing of toothed members, including hardened gears and the like, by which nicks and irregularities are removed so as to leave the gear teeth in a desired smooth state and accurate form. An object of the invention is to provide novel finishing apparatus of this kind by which toothed members, hereinafter referred to merely as gear members, can be abrasively finished in a rapid manner and with only a minimum amount of work or attention on the part of the machine operator.

Another object is to provide novel gear finishing apparatus having means for rotating a gear member and a gear-shaped tool member in meshed abrasive engagement, and means for producing a rapid vibratory movement between the gear and tool members in an out-of-phase relation to the rotative movement.

Still another object is to provide novel gear finishing apparatus of the character above mentioned wherein the tool member is driven by a power drive means to thereby rotate the gear member, and wherein brake means is effective to retard the rotation of the gear member, the power drive means preferably being reversible for causing rotation of the gear member successively in opposite directions.

A further object is to provide such a novel gear finishing apparatus wherein the out-of-phase characteristic of the vibratory movement is achieved by a so-called random traverse movement between the gear and tool members during the rotative and vibratory movements, and wherein fluid pressure responsive means produces the vibratory and traverse movements and is preferably effective on the tool member of the apparatus through tool spindle means thereof.

Yet another object is to provide novel gear finishing apparatus having work support units for supporting a plurality of gear members in finishing engagement with one and the same gear-shaped tool member for increased production output, and wherein the support units are pivotally mounted for swinging of the gear members into and out of such finishing engagement with the tool member.

The invention further provides novel gear finishing apparatus having a workholder unit comprising a pivoted support head for swinging the gear member along a first path of movement into mesh with the gear-shaped tool member, and a workholder head swingably connected with the support head for further swinging of the gear member along a second path extending transverse to the first path for varying the meshed engagement between the gear and tool members.

This invention also provides such novel gear finishing apparatus having adjusting means and stop means adapted for controlling the positioning of the gear member with respect to its meshed engagement with the tool member and its swingable movements to and from such meshed engagement, adjusting means adapted for varying the traverse movement between the tool and gear members, and power devices operable to produce the desired positioning and traverse movements between the gear and tool members.

Additionally this invention provides novel gear finishing apparatus having a gear-shaped tool member comprising a wear-resistant plastic part for abrasive co-operation with the gear member and which is constructed and mounted for ease of replacement, the plastic part preferably being made of nylon and preferably being yieldable for pick-up indentation by abrasive particles supplied during the finishing operation.

Other novel characteristics, objects and advantages of this invention will be apparent in the following detailed description and in the accompanying drawings forming a part of this specification and in which, FIG. 1 is a front elevation, with portions broken away, showing novel gear finishing apparatus of this invention;

FIG. 2 is a side elevation with portions of the apparatus broken away;

FIG. 3 is a vertical axial section taken through the traverse mechanism and tool spindle portion of the apparatus as indicated by section line 3—3 of FIGS. 1 and 9;

FIG. 6 is a front elevation of the work support unit when viewed as indicated by the directional line 6—6 of FIG. 5;

FIG. 8 is a partial rear elevation showing actuating means for swinging the work support unit, the view being taken as indicated by the directional line 8—8 of FIG. 5;

FIG. 9 is a partial rear elevation of the traverse mechanism when viewed as indicated by the directional line 9—9 of FIG. 4 but with the fluid conduits omitted;

FIG. 10 is a partial horizontal section through the traverse mechanism taken on section line 10—10 of FIGS. 4 and 9;

FIG. 11 is a larger scale sectional view taken through the rim portion of the tool member, as indicated by section line 11—11 of FIGS. 1 and 6;

FIG. 12 is an elevation of one of the slotted pivot disks of the traverse mechanism and showing the same in a detached relation;

FIG. 16 is a front elevation of a work support unit of a modified form;

Figure 17:
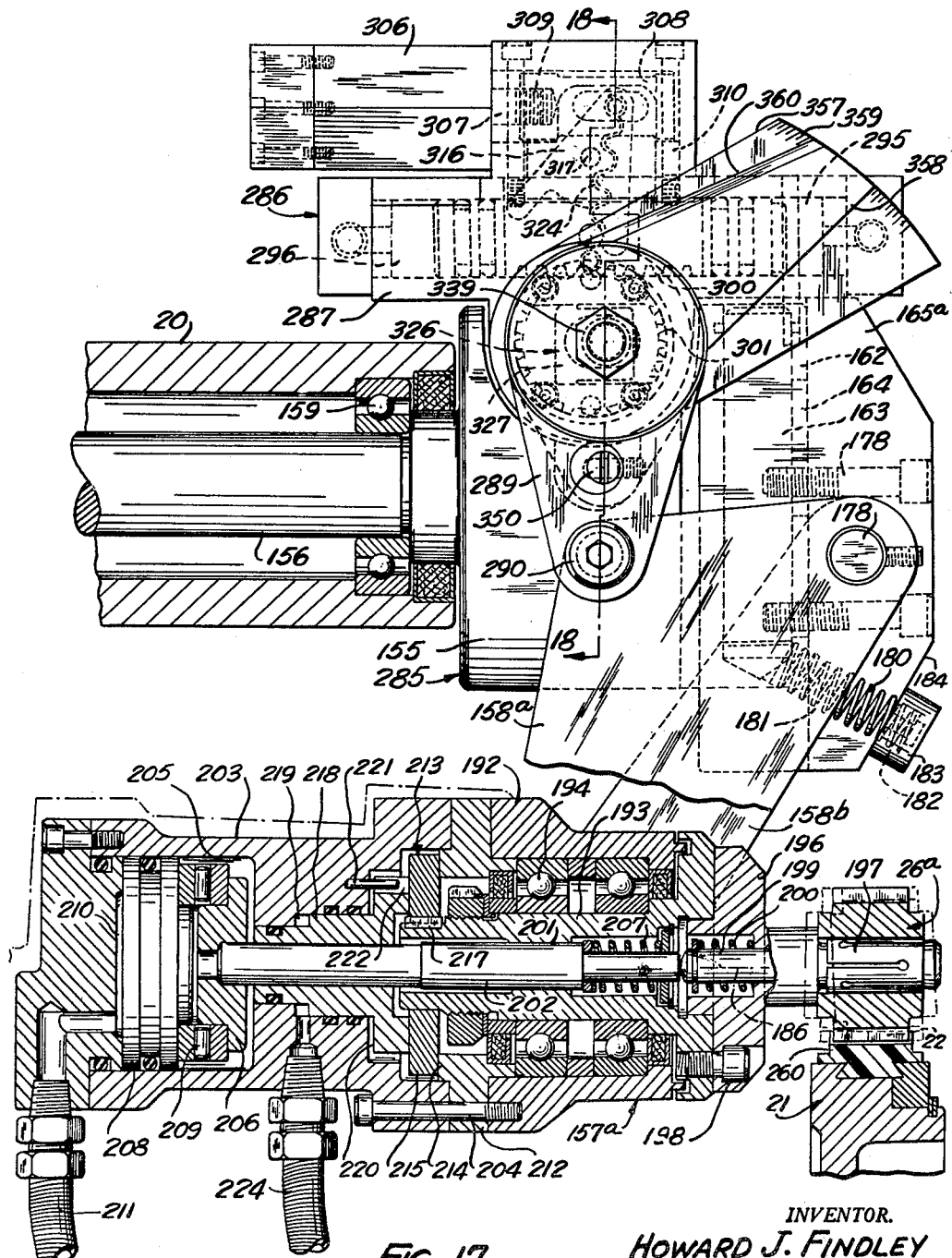
FIG. 17 is a vertical axial section through the modified work support unit taken on an irregular section line 17—17 of FIG. 16.
Figure 18:
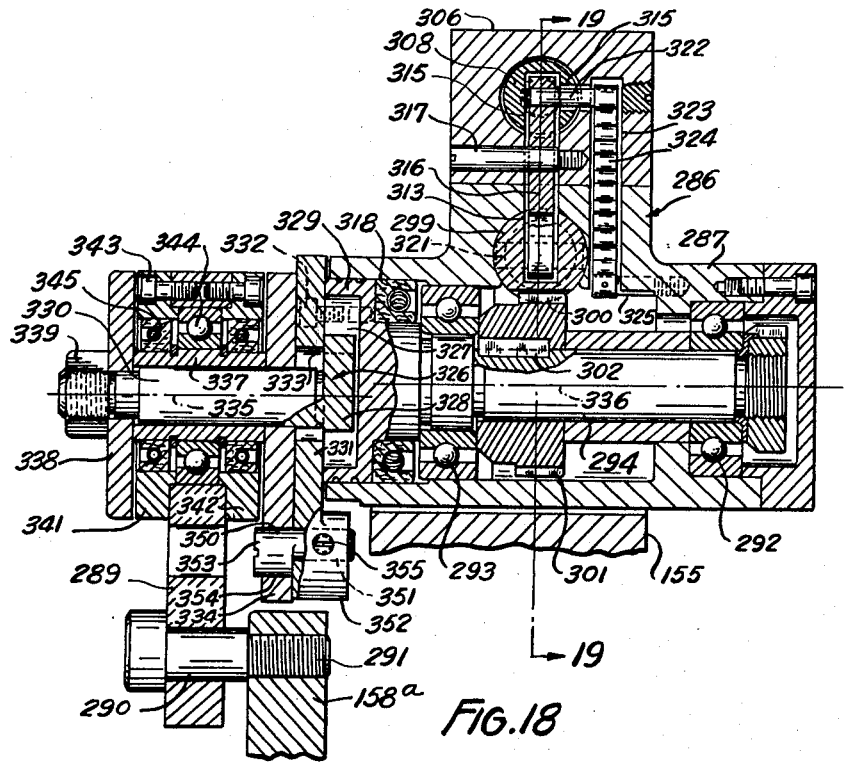
Figure 19:
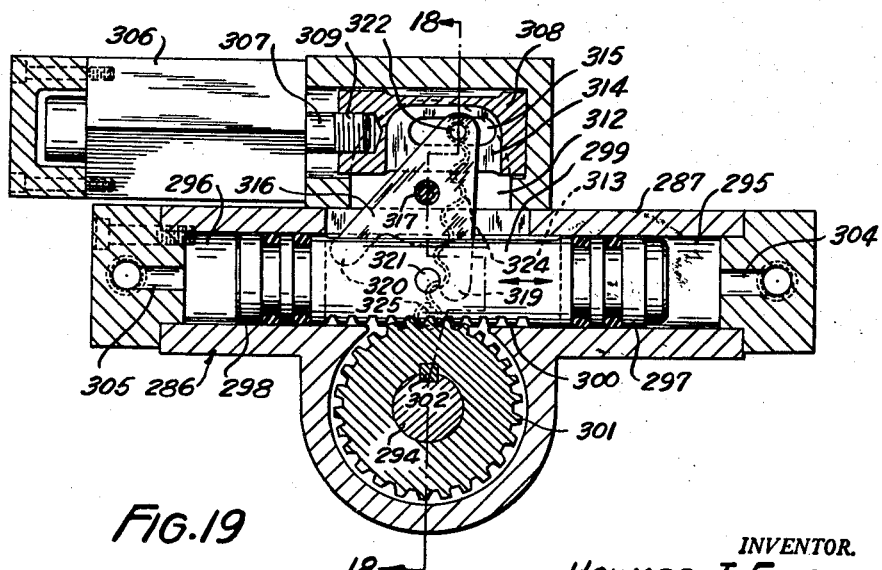

FIG. 18 is a partial transverse section taken on section line 18—18 of FIGS. 17 and 19; and FIG. 19 is a partial vertical axial section taken on section line 19—19 of FIGS. 16 and 18.

As a practical embodiment of this invention FIGS. 1 to 15 inclusive show a gear finishing apparatus in the form of a machine 15 having a frame structure 16 which includes a lower base portion 17 and an upper vertical portion 18 rising thereabove and provided with forwardly extending tool support and work support projections 19 and 20. The machine 15 is provided with a gear-shaped tool member 21 having a full peripheral series of gear teeth 22 and rotatably supported by tool spindle means 23 extending forwardly through the support projection 19. A work support unit 25 is swingably mounted in the work support projection 20 and is adapted to receive a workpiece in the form of a gear member 26 and to position the same in meshed engagement with the tool member 21 to be rotatably driven by the latter.

The machine 15 also includes means for producing an abrasive condition between the meshed portions of the tool and gear members 21 and 26 and which abrasive condition producing means is shown in FIGS. 1 and 2 as comprising supply pipe means 27 having one or more discharge nozzles 28 thereon for directing an abrasive fluid onto the tool member. The base portion 17 of the machine 15 is shown as having a fluid collecting chamber in the form of sump means 29 located beneath the tool member 21 for collecting the abrasive fluid which is drained or thrown therefrom.

The machine 15 is here shown as having a plurality of the work support units 25 located in angularly spaced relation at points around the rotation axis 30 of the tool member 21 so that a greater output from the machine can be achieved in a given time interval by having a plurality of the gear members 26 in engagement with the same tool member during the finishing operation. Since the work support units 25 are similar in construction and operation, only one of these units need be described in detail.

As shown in FIG. 1 the work support unit 25 is swingable, from a substantially vertically disposed full-line position in which the gear member 26 is in a meshed cooperative engagement with the tool member 21, to a retracted broken-line position 25ᵃ in which the gear member has been disengaged from the tool member and can be removed from the workholder unit and another gear member substituted in its place.

The machine 15 is here shown as having laterally extending splash guard means 31 attached to the frame structure 16 so as to extend partially around and in front of the tool member 21 at a location just above the sump means 29. The splash guard means 31 can be detachably connected with the frame structure 16 in any suitable manner and, if desired, can be omitted from the machine. The bottom wall 32 of the sump means 29 is provided with a drain opening to which a drain pipe 33 is connected for conducting the collected abrasive fluid to a suitable discharge point or reservoir.

The tool member 21 is rotatably driven during the finishing operation by suitable power means which is shown in FIGS. 1 and 2 as comprising a reversible electric drive motor 34 having a gear unit 35 thereon which includes a drive sprocket 36. A driven sprocket 37 is secured on the tool spindle means 23, as by means of a key, and is driven from the sprocket 36 by a chain 38 extending therearound. A suitably taut condition of the chain 38 is maintainable by tilting of the drive motor 34 about a support pivot 39, as by means of an adjustable hanger 40 connected between the frame structure 16 and a motor bracket 41 having the drive motor attached thereto.

During the operation of the machine 15 a rapid short-stroke vibratory movement is imparted to the tool member 21 along the axis of rotation thereof for producing the desired abrasive finishing action on the teeth of the gear member 26. Simultaneously with this vibratory abrasive action, the tool member 21 is rotatably driven by the electric motor 34 to thereby cause the gear member 26 to be rotated in mesh with the tool member for distributing the abrasive finishing action around the full circumferential tooth series of the gear member. The direction of rotation of the gear member 26 can be reversed by running the reversible driving motor 34 in a reverse direction and, as will be explained hereinafter, the rotation of the gear member can be retarded by a braking action effective thereon.

Additionally, a translatory movement is imparted to the tool member 21 during its rotative and vibratory movements as a to-and-fro axial movement of this member in a random, that is out-of-phase, relation to the rotative movement thereof. This traverse movement of the tool member 21 prevents the occurrence of an undesired pattern effect of the abrasive action on the gear member 26 and also produces a desired more even distribution of the abrading action on the teeth of the gear member. The machine 15 includes vibration-producing and traverse-producing mechanisms 45 and 46, and these mechanisms will presently be described.

At a point substantially opposite the tool support projection 19 the frame structure 16 is provided with a cylinder housing 47 forming a part of the vibrator mechanism 45. The cylinder housing 47 has a cylinder bore 48 therein and is mounted in a rear opening 49 of the upright frame portion 18 by suitable screws 50 extending through a mounting flange 51. The cylinder housing 47 is provided in the outer end portion 52 thereof with a cylinder chamber 53 for a purpose to be explained hereinafter and, at the inner end thereof, is provided with a cover member 54 which is secured thereto by suitable screws 55.

The tool spindle means 23 comprises a spindle shaft 58, in this case a hollow shaft having an axial passage 59 therein and hereinafter referred to merely as the tool spindle, and a clamping device 60 mounted on the outer end portion of the tool spindle for retaining the tool member 21 thereon. The tool spindle 58 is rotatably supported by suitable bearings, in this case, a pair of sleeve bearings 62 and 63 mounted respectively in the support projection 19 and the cylinder housing cover 54. The sprocket 37 includes a hub portion 64 and is secured on the tool spindle 58 at an intermediate point thereof by means of a collar 65 keyed on the spindle and having the hub 64 attached thereto by suitable screws 66.

Figure 4:
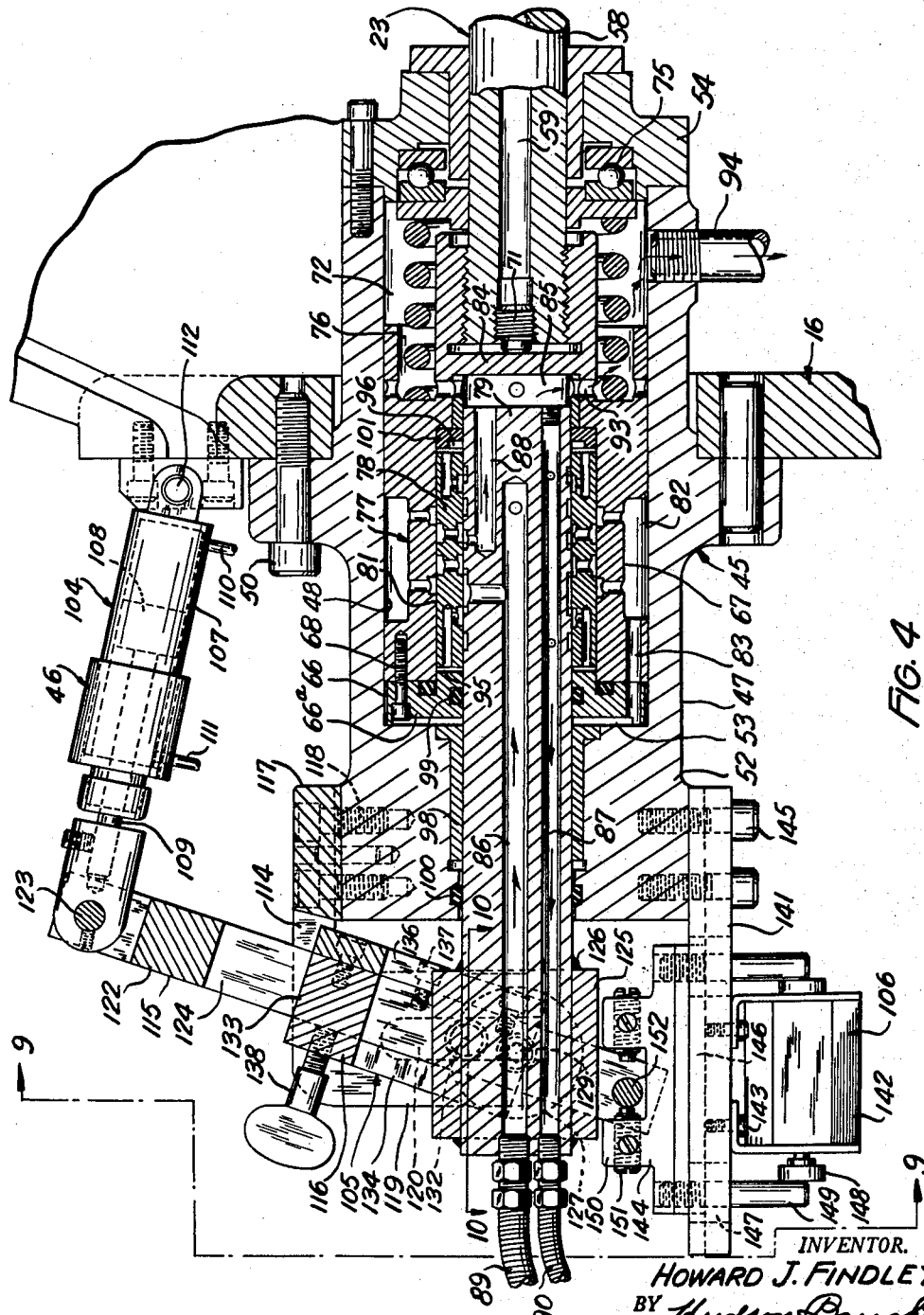
FIG. 4 is a partial vertical axial section corresponding with a portion of FIG. 3, but on a larger scale, and further illustrating the vibration-producing and traverse-producing mechanisms.

The vibrator mechanism 45 for the tool member 21 will be described next and, as shown in FIGS. 3 and 4, includes a piston 66 reciprocably operable in the cylinder bore 48 and connected with a tool spindle 58. The piston 66 comprises a piston cap 66ᵃ secured by screws 68 to a piston body having the form of a valve spool 67 which is slidable in the cylinder bore 48. The valve spool 67 includes a hollow axial projection 69 in which the rear end of the tool spindle 58 is secured by a threaded connection 70.

A locked engagement for the threaded connection 70 is obtainable by a locking screw 71 of the set screw type which produces a jammed effect between the threaded portions of the valve spool 67 and the tool spindle 58. The locking screw 71 is actuatable by means of a suitable tool inserted through the axial passage 59 of the tool spindle 58 so that this screw can be loosened whenever it is desirable to disconnect the tool spindle from the valve spool 67.

The vibratory movement of the tool member 21 is produced by fluid pressure actuation of the piston 66 and valve spool 67 in one direction, that is, toward the right as seen in FIGS. 3 and 4, and a return movement imparted to the valve spool and piston in the opposite direction by a compression spring 73 surrounding the projection 69 and disposed between the valve spool and a spring seat 74. The portion of the cylinder bore 48 lying between the valve spool 67 and the cylinder housing cover 54 forms a spring chamber 72 in which the spring 73 is disposed.

A thrust bearing 75 of the antifriction type is interposed between the spring seat 74 and the cylinder housing cover 54 and is suitably mounted in the latter. The end portion of the valve spool which is engaged by the spring 73 is provided with an annular recess 76 in which a portion of the spring is received so that the spring will be supported between the valve spool and the spring seat 74 in a coaxial relation to the rotation axis of the tool spindle 58.

From the construction and arrangement described above for the tool spindle 58 and the vibrator mechanism 45 it will be seen that the cylinder housing 47 and the cover 54 thereof are stationary, and that the tool spindle 58 and the valve spool 67 are rotatable together with the piston 66, the spring 73 and the spring seat 74. The valve spool 67 and the piston 66 thus rotate in the cylinder bore 48 while the tool spindle 58 and tool member 21 are being driven by the sprocket 37, and the rotation of the spring seat 74 relative to the cover 54 is permitted by the thrust bearing 75.

The actuation of the piston 66 in the cylinder bore 48 is produced by suitable pressure fluid being supplied to the cylinder chamber 53 through valve means 77 which is formed in part by the valve spool 67, and in part by associated valve members comprising a valve sleeve 78 and a valve plunger 79. The valve spool 67 is provided with a bore forming a valve chamber 81 therein in which the valve sleeve 78 is slidably disposed. The valve plunger 79 extends through the piston 66 and is slidable in the valve sleeve 78.

An annular groove extending around the outside of the intermediate portion of the valve spool 67 provides an annular fluid supply and exhaust chamber 82 which is connected with the cylinder chamber 53 by an axial passage 83. The inner end of the valve plunger 79 is spaced from a transverse wall portion 84 of the valve spool 67 by an intervening space forming an exhaust and leakage collecting chamber 85. The valve plunger 79 is provided with axial passages comprising a pressure fluid supply passage 86 and a first exhaust passage 87, and is also provided with an axial passage 88 forming a second exhaust passage which is continuously in communication with the exhaust chamber 85.

Pressure fluid supply and exhaust conduits 89 and 90 of a flexible character are connected respectively with the main fluid supply and exhaust passages 86 and 87 of the valve plunger 79 at the outer end of the latter. The exhaust chamber 85 is in communication with the spring chamber portion 72 of the cylinder bore 48 through the annular recess 76 and the radial connecting passages 93 so that exhaust and leakage fluid can enter the spring chamber to be drained therefrom through a discharge conduit 94.

The valve chamber 81 includes pressure compartments 95 and 96 in the valve spool 67 at opposite ends of the valve sleeve 78 so that when pressure fluid is admitted to these compartments alternately it will cause a rapid reciprocating control movement of the valve sleeve in this valve chamber. The porting of the valve members comprising the valve spool 67, the valve sleeve 78 and the valve plunger 79 is such that this rapid reciprocating control movement of the valve sleeve 78 will cause pressure fluid to be alternately supplied to, and exhausted from, the cylinder chamber 53 for causing the above-mentioned rapid short-stroke axial vibratory movement of the tool member 21.

The porting of the valve members 67, 78 and 79 is also such that when axial movements are imparted to the valve plunger 79 in opposite directions by the traverse mechanism 46 in the manner to be presently explained, the valve sleeve 78 and the valve spool 67 will follow the axial movements thus imparted to the valve plunger for causing a back-and-forth traverse movement of the tool member 21. During these axial shifting traverse movements of the valve spool 67, the reciprocating control movements of the valve sleeve 78 continue to take place and concomitantly cause the reciprocating movements of the valve spool 67 and piston 66 for producing the rapid vibratory movement of the tool member 21. The axial shifting movements of the valve sleeve 78 and the valve spool 67 in following the axial movements imparted to the valve plunger 79 by the traverse mechanism 46 occur automatically by the action of the pressure fluid thereagainst.

The axial control movements described above for the valve plunger 79 are sliding movements of this member accommodated by a bearing sleeve 98 mounted in the outer end portion 52 of the cylinder housing 47. Suitable packing rings 99 and 100 are provided in the vibrator mechanism 45 in sealing engagement with the valve plunger 79. The piston cap 66ª is preferably formed as a cover member for the valve chamber 81 and for the outer end compartment 95 thereof. The fluid pressure compartment 96 is formed by the inner end portion of the valve chamber 81 and, in this case, is also formed in part by an annular recess in an insert ring 101.

The axial passage 86 of the valve plunger 79 is the main supply passage of the vibrator mechanism 45 and supplies pressure fluid to the pressure compartments 95 and 96 associated with the control sleeve 78 as well as to the main cylinder chamber 53. The axial passage 87, which is referred to above as a first exhaust passage, is the exhaust passage for compartments 95 and 96. The second exhaust passage 88 is the exhaust passage for the cylinder chamber 53.

The size, shape and location of the various ports and lands of the valve members 67, 78 and 79 comprising the valve means 77 can be varied as desired for correspondingly varying the operating characteristics of the vibrator mechanism 45, including the vibration rate and vibration stroke length for the tool member 21.

The traverse mechanism 46 will be described next with reference to the showing thereof in FIGS. 4, 9 and 10. The traverse mechanism 46 comprises, in general, a fluid pressure actuatable cylinder device 104, a yoke mechanism 105 for operably connecting the cylinder device with the outer end of the valve plunger 79, and a valve device 106 for controlling the fluid pressure actuation of the cylinder device 104.

The cylinder device 104 is here shown as comprising a double-acting cylinder 107 having a piston 108 reciprocably operable therein and attached to a piston rod 109. The cylinder 107 is provided with fluid pressure supply and exhaust conduit connections 110 and 111 at opposite ends thereof and which extend to the cylinder from the valve device 106. The inner end of the cylinder 107 is swingably connected with the frame structure 16 as by a pivot pin 112.

The yoke mechanism 105 comprises a support yoke 114, an actuating yoke 115, and an adjusting yoke 116. The adjusting yoke 116 also forms a fulcrum member having a fulcruming co-operation with the support yoke 114 as will be presently described. The actuating yoke 115 imparts axial movements in opposite directions to the valve plunger 79 in response to fluid pressure actuation of the cylinder device 104, and also actuates the valve device 106 as a reversing valve for causing reversal of the cylinder device at the ends of the operative strokes of the piston 108 thereof.

The support yoke 114 includes a transverse connecting portion 117 by which it is attached to the cylinder housing 47, as by means of screws 118, and a pair of spaced parallel support arms 119 depending from such connecting portion and provided with fulcrum slots 120.

The actuating yoke 115 comprises a transverse connecting portion 122 at the upper end thereof which is connected with the piston rod 109, as by a pivot pin 123, and a pair of spaced parallel arms 124 depending from such connecting portion and extending in a straddling relation to the outer end portion of the valve plunger 79. The outer end portion of the valve plunger 79 has a block 125 suitably secured thereon, in this case attached thereto by welds 126. The block 125 is disposed in the yoke recesses of all three yoke members, that is, between the pairs of arms of the support yoke 114, the actuating yoke 115, and the adjusting and fulcrum yoke 116.

An actuating connection between the actuating yoke 115 and the block 125 is formed by a pair of pivot disks 127 located on opposite sides of the block and rotatably received in pivot recesses 128 of the latter. The pivot disks 127 are retained in the recesses 128 by suitable retaining screws 129 which are threaded into the block 125 but do not prevent pivotal movement of the disks in their recesses. The pivot disks 127 are provided in the outer faces thereof with transverse slots 131 in which the arms 124 of the actuating yoke 115 are engaged as shown in FIGS. 9 and 10.

The adjusting yoke 116 is mounted in a desired position of adjustment on the actuating yoke 115 and carries fulcrum pins 132 which are received in the slots 120 of the support yoke 114 and pivot in the latter during the actuating swinging movement imparted to the actuating yoke 115 by the cylinder device 104. The adjusting yoke 116 comprises a transverse connecting portion 133 and a pair of guide arms 134 depending therefrom and having the inner ends of the fulcrum pins 132 fixed therein as shown in FIG. 10.

The guide arms 134 have guide slots 135 therein, which are also formed in part by guide strips 136, and lie opposite the slots 131 of the pivot disks 127. The guide strips 136 are secured to the guide arms 134 as by means of suitable screws 137. The adjusting yoke 116 is slidably shiftable along the arms 124 of the actuating yoke 115 for altering the fulcrum position of the pins 132 along the slots 120 of the support yoke 114 and is adapted to be secured in the desired position of adjustment along the actuating yoke by thumb screws or the like 138. The screws 138 are threaded in the connecting portion 133 of the yoke 116 at locations so that their inner ends clampingly engage the arms 124 of the actuating yoke 115.

From the construction of the traverse mechanism 46 and the arrangement of the yokes 114, 115 and 116 as above described, it will be seen that when the adjusting yoke 116 is secured on the actuating yoke 115 in a location so that the fulcrum pins 132 are in an offset relation to the pivot axes of the pivot disks 127 a lever-arm effect will be produced for the actuating yoke 115 whereby swinging of the latter on the fulcrum pins 132 will impart axial traverse-control movements to the valve plunger 79 and the length of these axial movements will be in accordance with the extent of the swinging movement imparted to the actuating yoke by the cylinder device 104 and the eccentricity of the adjusted position of the fulcrum pins 132 relative to the pivot axes of the pivot disks 127.

The valve device 106 for controlling the cylinder device 104 comprises a support bracket 141, a reversing valve unit 142 adjustably attached to the bracket by screws 143, and a valve actuating slide 144 shiftable on the bracket 141 by the action of the lower end of the actuating yoke 122. The bracket 141 is suitably attached to the cylinder housing 47, as by screws 145, and has a longitudinal guideway 146 in which the slide 144 is movable and which guideway is intersected by a pair of transverse slots 147. The valve unit 142 is of a suitable type for controlling the supply and exhaust of fluid to opposite ends of the cylinder 107 and includes a shiftable valve member having end portions 148 thereof projecting from the unit and engageable by actuating pins 149 depending from the slide 144 through the slots 147.

The slide 144 has spaced lugs 150 thereon which are provided with adjustable abutment screws 151 whose adjacent inner ends are in a spaced apart relation and form abutment elements engageable by the intermediate portion of an actuating rod 152 extending therebetween and carried by the lower end portions of the arms 124 of the actuating yoke 115. As the actuating yoke 115 approaches the end of the swinging movement imparted thereto by the cylinder device 104, the rod 152 engages one of the abutment screws 151 to thereby shift the slide 144 along the bracket 141 whereby one of the actuating pins 149 of the slide will engage one of the projecting end portions 148 of the movable valve element of the valve unit 142 for shifting such element to automatically cause reversal of the cylinder device 104, and consequently, a reversal of the swinging movement of the actuating yoke 115.

Since the vibratory and traverse movements imparted to the tool member 21 are produced by fluid pressure actuated power devices 45 and 46 respectively, whereas the rotative movement of the tool member is imparted thereto by the electric drive motor 34, it will be recognized that there is no synchronization between the functioning of the fluid pressure actuated devices and the electric motor 34, and consequently, the vibratory and traverse movements, and particularly the latter, will be in a nonsynchronized relation to the rotative movement of the tool member. The nonsynchronized operating relationship thus achieved causes the abrading action on the gear member 26 to be more evenly distributed and prevents the occurrence of any undesirable pattern effects.

Figure 5:
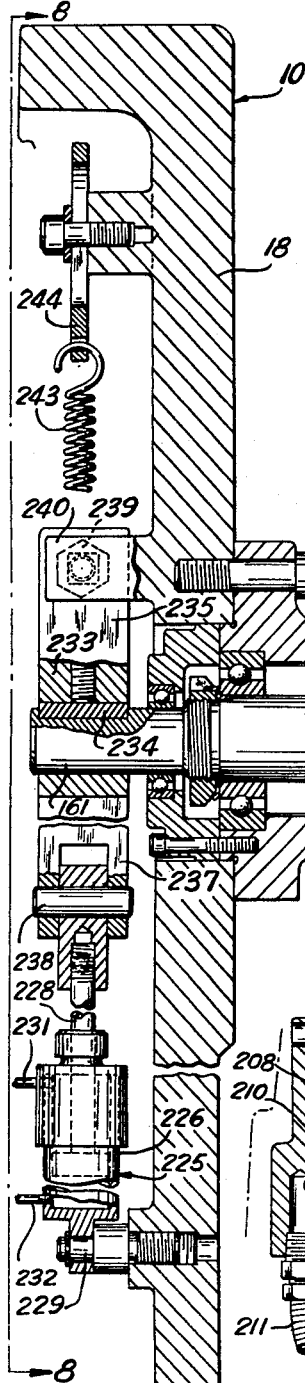
FIG. 5 is a partial vertical axial section taken through one of the work support units of the machine, the view being taken approximately on section line 5—5 of FIG. 1 but on a larger scale.

The workholder unit 25 will be described next with reference to the constructional features thereof illustrated in FIGS. 5 to 8 inclusive. The workholder unit 25 comprises, in addition to the work support projection 20 of the frame structure 16, a support head 155 fixed on a rockshaft 156 and a workholder head 157 flexibly connnected with the support head by a pair of wide and narrow yoke arms 158$^a$ and 158$^b$. The rockshaft 156 extends through the support projection 20 and is rockably mounted in the latter by spaced antifriction bearings 159. For a purpose to be explained hereinafter, the rockshaft 156 has a reduced end portion 161 extending through an opening of the frame structure 16 so as to project from the rear side thereof as shown in FIG. 5.

The support head 155 has an upright guide portion 162 on the front thereof which is provided with a vertical bore 163 and with a vertical slot 164 communicating with such bore. A channel-shaped slide 165 is mounted on the guide projection 162 with the latter extending into a guideway 166 formed by the channel recess of the slide. A clamping pin 167 is slidable in the bore 163 for slide adjusting purposes and is connected with the slide 165 by clamping screws 168 which extend through holes in the slide and through the slots 164 of the guide projection 162.

The pin 167 and the screws 168 thus provide a clamping means by which the slide 165 can be secured on the support head 155 at a desired position of vertical adjustment to which it may be moved along the guide projection 162. During the vertical adjusting movement of the slide 165 the clamping pin 167 moves with the slide and, when the screws 168 are tightened, the pin produces a clamping action in the bore 163 of the support head 155 for retaining the slide 165 in its vertically adjusted position.

The slide 165 includes a bracket 170 which is rigidly connected with the slide by being mounted on the upper end thereof. The bracket 170 is here shown as comprising a plate 171 secured to the slide 165 by attaching screws 172, and an arm 173 connected with the plate by attaching screws 174 and extending in a depending relation from the plate along one side of the support head 155. The position to which the slide 165 is vertically adjustable on the guide projection 162 of the support head 155 is determined by a thrust screw 175 which is threaded through the plate 171 and whose lower end seats against the top portion of the support head. The thrust screw 175 provides a means for shifting the slide 165 by small increments along the guide projection 162 of the support head 155 while the clamping action of the pin 167 is released and, when the adjusted position of the slide has been obtained, the thrust screw is locked against further rotation by means of a set screw 176.

Figure 7:
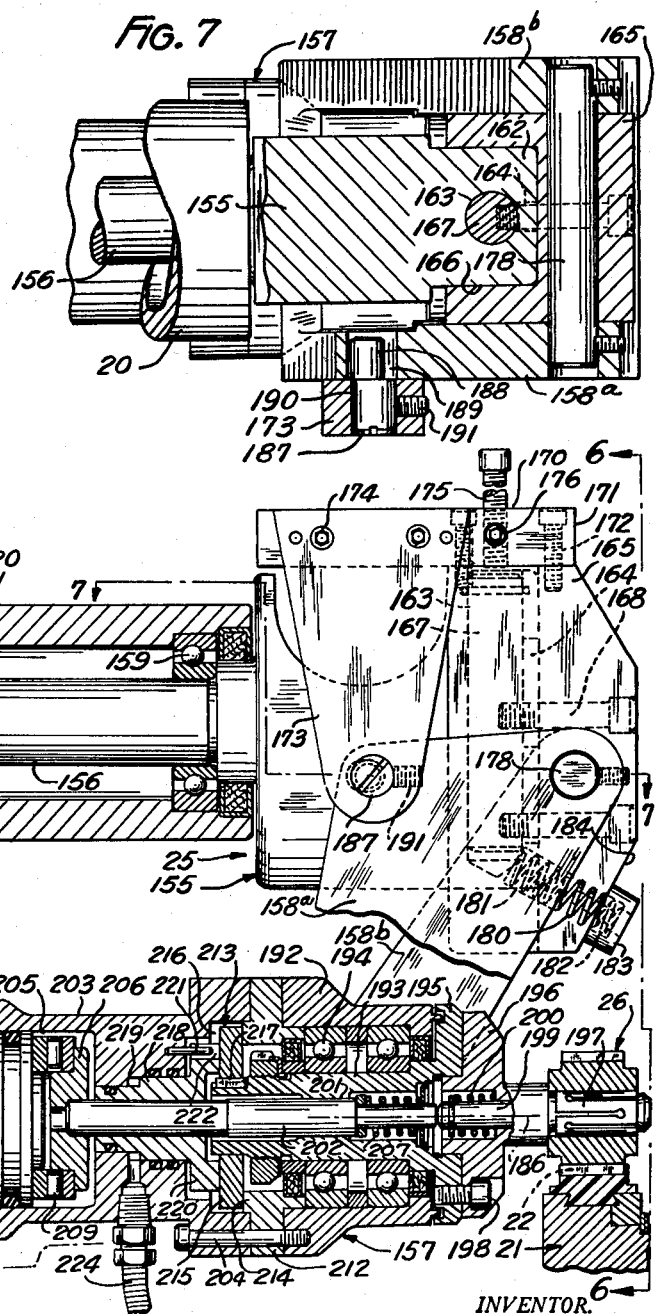
FIG. 7 is a horizontal section taken through the support head of the work support unit as indicated by section line 7—7 of FIG. 5.

The yoke arms 158$^a$ and 158$^b$ have their lower ends rigidly connected with the workholder head 157 and their spaced upper ends extend in a straddling relation to the slide 165 as shown in FIG. 7. The upper ends of the arms 158$^a$ and 158$^b$ are pivotally connected with the slide 165 by a transverse pivot pin 178 extending through the latter whereby the workholder head 157 is supported by the slide, so that the vertical adjustment of the latter described above, varies the positioning of the workholder head relative to the tool member 21 to permit the mounting of a gear member of a different size on the workholder head, and also provides an in-and-out adjusting movement for the depth of tooth engagement between the gear member 26 and the tool member 21. A pair of compression springs 180, located in pockets 181 extending into the yoke arms 158ᵃ and 158ᵇ edgewise thereof, have their outer ends received in opposed pockets 182 formed in a spring seat bar 183.

The bar 183 extends in front of the yoke arms 158ᵃ and 158ᵇ, as shown in FIGS. 5 and 6, and has the intermediate portion thereof secured against the lower beveled face 184 of the slide 165 by clamping screws 185. The springs 180 are preferably preloaded springs so as to normally exert thrust against the yoke arms 158ᵃ and 158ᵇ for substantially counterbalancing the weight of the workholder head 157 and for taking up lost motion which might otherwise occur between movable parts of the work support unit 25.

From the construction of the work support unit 25 as thus far described it will be seen that after the gear member 26 is placed on the unit while the latter is in its broken-line retracted position 25ᵃ of FIG. 1, the unit is swung to its full-line vertical position. This swinging of the work support unit 25 causes a translatory movement of the gear member 26 substantially in the plane of the tool member 21 whereby the gear member is brought into meshed engagement with teeth of the latter. As the gear member 26 is thus moved into such meshed engagement, the final portion of the meshing movement is a rolling contact of the gear member on the tool member 21. The depth of engagement of the teeth of the gear member 26 in the tooth spaces of the tool member 21 will be determined by the vertical position to which the slide 165 has been adjusted in the manner explained above.

The position of the workholder head 157 is also swingably adjustable for locating the rotation axis 186 of the gear member 26 in a horizontal position parallel with the rotation axis 30 of the tool member 21, or for tilting the rotation axis of the gear member upwardly or downwardly relative to the rotation axis of the tool member as may be desired for producing different desired crowning effects or contours on the teeth of the gear member. This adjustment of the horizontal position of the workholder head 157 is accomplished by swinging of the head about the axis of the fulcrum pin 178 and which swinging can be produced by an eccentric adjusting pin 187 forming a reactive adjusting connection between the wide yoke arm 158ᵃ and the bracket arm 173.

The pin 187 has an eccentric cylindrical actuating stem portion 188 engaged in a slot 189 of the wide yoke arm 158 and a cylindrical head 190 rotatable in a pivot opening of the bracket arm 173. Rotation of the adjusting pin 187 accordingly causes the above-mentioned swinging adjustment of the workholder head 157 about the axis of the fulcrum pin 178 and which is in a direction transverse to the path of the tool-engaging and tool-disengaging swinging of the gear member 26. The adjusting pin 187 can be locked in the rotative position corresponding with the desired adjustment of the workholder head 157, as by a suitable set screw 191. The springs 180 expand or are compressed, depending upon whether the yoke arms 158ᵃ and 158ᵇ are moved away from or toward the bar 183 by the rotation of the eccentric adjusting pin 187 as just described above.

The workholder head 157 will now be further described with respect to the construction thereof illustrated in FIG. 5. The workholder head 157 comprises a hollow body portion 192 to which the yoke arms 158ᵃ and 158ᵇ are connected and in which a spindle carrier 193 is rotatably mounted by a pair of antifriction bearings 194. The spindle carrier 193 includes a front flange 195 to which the mounting flange 196 of a suitable chuck 197 is secured by fastening screws 198. The chuck 197 is here shown as being a collet-type chuck which projects from the mounting flange 196 for receiving the gear member 26 thereon and is expansible in the central opening of the gear member for retaining the latter in a mounted or chucked position.

The chuck 197 includes an actuating stem 199 which is slidable in and extends through the mounting flange 196 coaxially thereof. The spindle carrier 193 is provided with a central axial guide passage 201 in which a chuck actuating plunger 202 is slidably movable for engagement of the outer end of such plunger with the inner end of the chuck actuating stem 199. A compression spring 200 disposed around the stem 199 and effective thereon normally tends to cause expansion of the chuck when the actuating plunger 202 is retracted.

A cylinder member 203 is attached to the body 192 by connecting screws 204 and is provided with a cylinder bore 205. The inner end of the plunger 202 extends into the bore 205 and has a thrust collar 206 secured thereon. The plunger 202 is actuatable toward the right in opposition to a compression spring 207 for moving the chuck actuating stem 199 in a direction to permit contraction of the chuck 197 for releasing the gear member 26. The compression spring 207 is loctaed in an axial recess of the spindle carrier 193 and retracts the plunger 202 to permit the chuck 197 to be expanded for gripping a new gear member when it is placed thereon.

The chuck-releasing movement of the plunger 202 is produced by actuation of a piston 208 in the cylinder bore 205 whereby thrust is transmitted to the collar 206 through an interposed thrust bearing 209. The thrust bearing 209 permits free rotation of the collet 197, the spindle carrier 193, the plunger 202 and the thrust collar 206, without need for rotation of the piston 208 in the bore 205. The power stroke of the piston 208 is produced by suitable pressure fluid supplied to the cylinder chamber 210 through a conduit 211 connected with the latter, and the return stroke of the piston is produced by the compression spring 207.

During the operation of the machine 15 the gear member 26 is rotated by the tool member 21 in one direction or the other, depending upon the direction of operation of the reversible drive motor 34, so that both side faces of the teeth of the gear member can be abrasively finished. The abrasive finishing action on the gear member 26 results in part from the fact that rotation of the gear member is retarded or braked during the finishing operation. For this purpose the workholder head 157 is provided with brake means 213 which is effective on the gear member 26 through the spindle carrier 193 after the gear member has been placed in mesh with the tool member 21.

The brake means 213 comprises a pair of co-operating relatively rotatable brake members 214 and 215 provided in a brake chamber 216 of the cylinder housing 203. The brake member 214 is a stationary brake member in the form of an annular shoulder projecting axially into the brake chamber 216 from a mounting flange 212 which is clamped between the body 192 and the cylinder housing 203 by the screws 204. The brake member 215 is a brake disk secured on the inner end of the spindle carrier 193 as by means of a key 217.

The brake means 213 also comprises an annular actuating piston 218 in the form of a shouldered sleeve slidable on the plunger 202 and extending into an annular brake cylinder chamber 219 provided in the cylinder housing 203. The outer end of the brake piston 218 carries a thrust ring 220 in actuating engagement with the brake disk 215 for pressing the latter against the annular stationary brake member 214. The brake piston 218 is prevented from rotating in the brake cylinder 219 as by means of an anchor pin 221 mounted in the cylinder housing 203 and projecting into a slot 222 of the thrust ring 220. Suitable brake-actuating pressure fluid is supplied to the brake cylinder chamber 219 through a conduit 224 communicating therewith.

As has been mentioned above, the gear member 26 is swingable into and out of meshed engagement with the tool member 21 by a swinging of the workholder head 157 produced by rocking of the rockshaft 156. For causing such rocking of the rockshaft 156 the machine 15 is provided with a power device, in this case the double-acting power cylinder device 225 of FIGS. 5 and 8, which is operably connected with the above-mentioned rearwardly projecting stem portion 161 of the rockshaft.

The cylinder device 225 comprises a cylinder 226 having a piston 227 reciprocable therein and a piston rod 228 connected with such piston. The lower end of the cylinder 226 is swingably connected with the frame structure 16 as by a suitable pivot pin 229. Conduits 231 and 232, connected with the cylinder 226 adjacent the ends thereof, provide for pressure fluid to be supplied to and exhausted from the cylinder chambers.

The cylinder device 225 is effective on the rockshaft stem 161 by having the piston rod 228 connected with a lever 233 secured on such stem as by a key 234. The lever 233 is provided with arms 235, 236 and 237, the latter of which is a forked arm having the outer end of the piston rod 228 attached thereto by a transverse pivot pin 238. Operation of the cylinder device 225 causes rocking of the rockshaft 156 in opposite directions to produce the above-described swinging of the gear member 26 into and out of meshed engagement with the tool member 21.

The arm 235 of the lever 233 is provided with an adjustable abutment screw 239 which is engageable with a stop projection 240 on the frame structure 16 for limiting further rocking of the shaft 156 when the gear member 26 has been fully engaged with the tool member 21. The engaged position of the gear member 26 relative to the tool member 21 can be varied by adjusting the position of the abutment screw 239 in the arm 235 and which screw can be locked in the desired position of adjustment by a lock nut 241.

The arm 236 of the lever 233 forms a part of a safety feature for moving and holding the gear member 26 out of engagement with the tool member 21 upon failure of the cylinder device 225 for any reason, such as on account of a pressure failure in the actuating fluid for the cylinder 226. This safety feature also comprises a tension spring 243 having one end attached to the arm 236 and the other end secured to the frame structure 16 by an adjustable anchor member 244. The pull of the spring 243 on the arm 236 will accordingly provide a fail-safe action for moving the gear member 26 out of engagement with the tool member 21 whenever the cylinder device 225 becomes disabled. The spring 243 also serves to assist the cylinder device 225 when the latter is actuated to swing the workholder head 157 to the unloading position and, in addition, serves as an antirattle device for taking up lost motion and improving the accuracy of the finishing operation carried out by the machine 15.

The tool member 21 of the machine 15 can be of various forms, but the construction thereof illustrated in the drawings has important advantages. The tool member 21, as shown in FIGS. 3, 6 and 11, comprises a wheel-shaped body 246 having a central hub 247 provided with a splined opening 248 in which a correspondingly splined portion of the tool spindle 58 is engaged for mounting the tool member on the latter. The body 246 includes an annular rim portion 249 provided with a main annular peripheral groove 250 which includes an undercut dovetail portion 251 at one side thereof. The opposite side of the groove is formed by a removable ring member 252 mounted on a cylindrical shoulder portion 253 of reduced diameter formed on the body portion 246.

The ring member 252 is retained on the cylindrical shoulder portion 253 and in engagement with an annular radial abutment shoulder 254 of the body by retaining ring means 255. The retaining ring means 255 comprises two companion spring rings engaged in a locking groove 256 of the reduced cylindrical portion 253 and forming a radially projecting annular locking means lying alongside of the removable ring member 252 on the side thereof remote from the main groove 250. The radially projecting portion of the ring member 252 is provided, on the side thereof facing the main groove 250, with an undercut portion 257 similar to the undercut portion 251 so that these two undercut portions together complete the dovetail form of the transverse cross-sectional shape of the main groove 250.

The tool member 21 also comprises a plastic annular rim member 260 which is removably mounted on the body 246 and carries the above-mentioned gear teeth 22 which are of a size, shape and pitch suitable for the desired meshing engagement and finishing co-operation with the teeth of the gear member 26. The rim member 260 includes a holding portion 262 forming an annular base thereon and extending therearound on the inside thereof for seating engagement in the main annular groove 250 of the body 246. The holding portion 262 is of a dovetail cross-sectional shape to substantially mate with the groove 250 and to be locked and retained in the latter when the annular ring member 252 and the retaining ring means 255 have been assembled in place on the body 246 as shown in the drawings.

The rim member 260 preferably also has annular lateral extensions 263 and 264 thereon which project axially from this rim member on opposite sides thereof at a point between the dovetail shaped base 262 and the peripheral teeth 22. The annular projections 263 and 264 extend respectively into overlapping relation to the annular portion of the body 246 having the undercut 251 thereon and the ring member 252 for causing the rim member 260 to be more firmly supported and mounted on the body 246 when it is in its assembled position thereon.

The rim member 260 is formed of a flexible plastic material having a high resistance to wear by abrasion. A plastic material especially suitable for the rim member 260 is nylon although any other suitable plastic material having equivalent characteristics could be used. The rim member 260 is molded, or otherwise suitably formed from the plastic material, so as to have the shape described above.

The flexible character of the rim member 260 enables the same to be indented by solid abrasive particles in the abrasive fluid, which is supplied to the tool member 21 for producing the desired abrading finishing action on the gear member 26. The indentation of the abrasive particles into the plastic material temporarily connects the same with the rim member 260 so that the particles are more effective in the abrading action produced thereby on the gear member 26. The tough and abrasion-resistant characteristics of the rim member 260 enable the same to resist wear during the finishing operation carried out on the gear member 26 so that the rim member will render a prolonged period of service before replacement by a new rim member is needed.

The tool member 21 is removably mounted on the splined portion of the tool spindle 58 so that different tool members can be substituted, as needed, for the particular gear members to be finished. When the tool member 21 has been moved to its splined position on the tool spindle 58, it is retained thereon by the engagement of the releasable clamping device 60 in an annular groove 266 provided in the tool spindle adjacent its outer end. The clamping device 60 may be of any appropriate form, but the construction shown therefor in FIGS. 13, 14 and 15 has definite advantages.

The clamping device 60 comprises co-operating clamp members in the form of segments 267 and 268 having their adjacent ends swingably connected by a pivot pin 269. The opposite ends of the segments 267 and 268 are in a spaced-apart relation and are connected by a toggle mechanism 270 extending therebetween and which includes a curved swingable actuating handle 271 extending part-way around the outside of the clamp and lying alongside the segment 268 when the clamp is in its closed and locked condition shown in FIG. 13. The segments 267 and 268 are provided on the inside thereof with co-operating clamping portions 272 and 273 which are contractible into the groove 266 for clampingly engaging the tool spindle 58 when the clamp is applied thereto and locked thereon.

The toggle mechanism 270 includes an adjusting screw 274 has threaded stems carrying right- and-left-hand propriately adjusted to produce the desired degree of clamping effect on the tool spindle 58. The toggle mechanism 270 comprises a first link 277 located in a forked outer end portion 267ᵃ of the segment 267 and connected therewith by a pivot pin 278, and a second link 279 lying opposite the first link and connected therewith by the adjusting screw 274. The second link 279 is received in the recess 275 of a forked arm portion 271ᵃ of the handle 271 and has its outer end pivotally connected with such forked portion by a pivot pin 280. The adjusting screw 274 has threaded stems carrying right-and-left-hand threads which are engaged in correspondingly threaded openings provided in the adjacent ends of the links 277 and 279.

The end portion 268ᵃ of the segment 268 is a forked portion having a recess 276 into which the forked arm portion 271ᵃ of the lever 271 extends. The two blades of the forked arm 271ᵃ are pivotally connected with the two blades of the forked segment portion 268ᵃ by a pair of pivots 281ᵃ and 281ᵇ. The blades of the forked arm 271ᵃ of the actuating handle 271 thus straddle the second link 279 and lie between such second link and the blades of the forked portion 268ᵃ of the segment 268.

Figure 13:
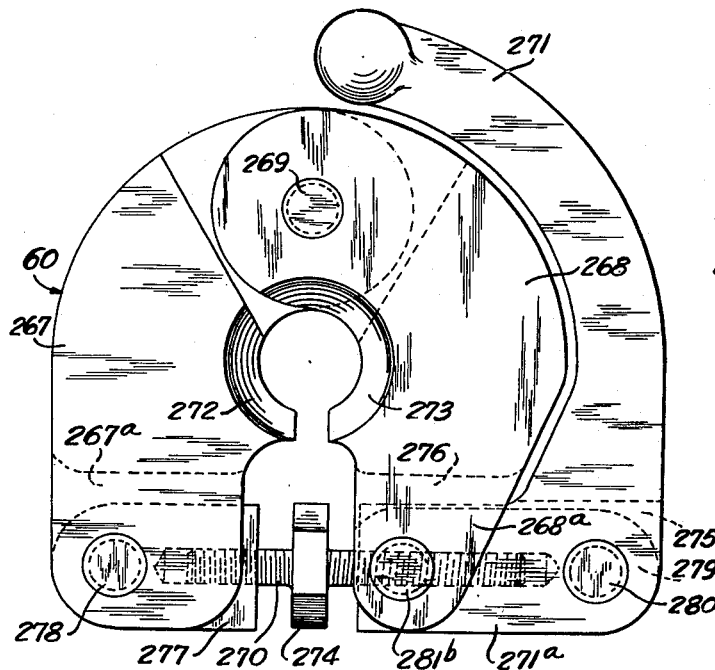
FIG. 13 is a front elevation of a retaining clamp for the tool member.
Figure 15:
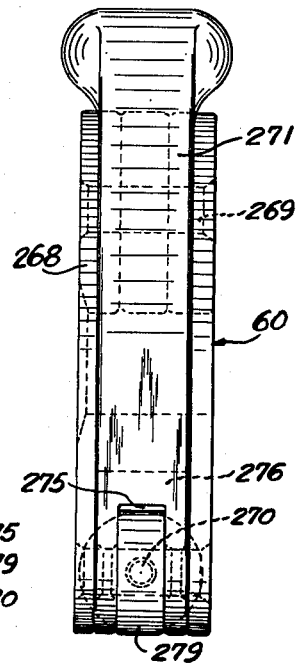
FIG. 15 is a side elevation of the retaining clamp.
Figure 14:
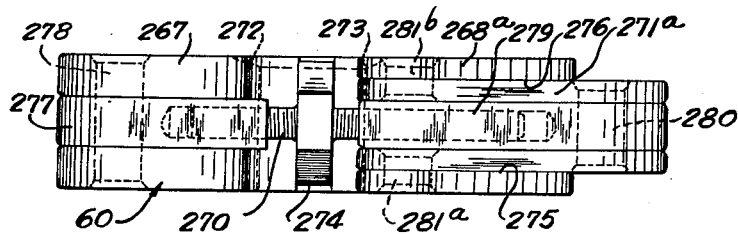
FIG. 14 is a bottom view of the retaining clamp.

From the construction just described for the clamping device 60 it will be seen that this device can be quickly applied to, or removed from, the tool spindle 58 whenever the removal or replacement of the tool member 21 is desired. Swinging of the actuating handle 271 to and from its locked position shown in FIG. 13 is all that is needed to actuate the clamping device 60 to its closed and open conditions relative to the spindle portion with which it co-operates.

From the construction of the workholder unit 25 of the machine 15 as shown in FIGS. 5, 6 and 7 and described above it will be recalled that swinging of the workholder head 157 with the gear member 26 thereon, in a direction transverse to the swinging thereof produced by a rocking of the rockshaft 156, is an adjusting swinging movement which can only be produced in that embodiment by manual rotation of the eccentric pin 187. In FIGS. 16 to 19 inclusive, however, a modified form of workholder unit 285 is shown by which the transverse swinging of a workholder header 157ᵃ and gear member 26ᵃ can be produced as a power-actuated swinging movement during the abrasive finishing operation on the gear member so as to produce a desired crown effect on the teeth thereof.

In the modified workholder unit 285 the same rockshaft 156, support head 155, and workholder head are used as have been described above for the workholder unit 25. These corresponding components are of the same construction and general purpose, as have already been described above, when the modified workholder unit 285 is being used in the machine 15. The same reference numerals have accordingly been used on similar parts except that the gear member is designated 26ᵃ, the workholder head is designated 157ᵃ and the slide is designated 165ᵃ.

The modified workholder unit 285 differs from the unit 25 by reason of certain different components carried by the slide 165ᵃ and which will now be described. The components carried by the slide 165ᵃ comprise a power device 286 having a housing 287 secured on the upper portion of the slide by attaching screws 288ᵃ and 288ᵇ, and an actuating arm 289 swingable by the power device and extending downwardly therefrom into an overlapping relation to the upper end of the wide yoke arm 158ᵃ of the work support head 157ᵃ. The lower end of the actuating arm 289 is pivotally connected with the wide yoke arm 158ᵃ by a shouldered screw 290 having a threaded portion 291 locked in the yoke arm so that swinging of the actuating arm 289 by the power device 286 will cause the above-mentioned transverse swinging of the workholder head 157ᵃ and the gear member 26ᵃ.

The housing 287 is provided with a pair of laterally spaced antifriction bearings 292 and 293 by which a driving shaft 294 for the actuating arm 289 is pivotally supported. The housing 287 is also provided with a pair of aligned and oppositely disposed fluid pressure cylinders 295 and 296 (see FIG. 19) in which a pair of pistons 297 and 298 connected by a connecting yoke 299 are reciprocably operable. The connecting yoke 299 is provided on the lower side thereof with a rack 300 having meshed engagement with a drive pinion 301 which is fixed on the shaft 294 as by means of a key 302.

Pressure fluid supplied to and exhausted from the cylinders 295 and 296 through passages 304 and 305 actuates the pistons 297 and 298 for causing the rack 300 to drive the pinion 301 and thereby oscillate the shaft 294 to cause the above-mentioned swinging of the actuating arm 289. The housing 287 includes a control valve portion 306 having suitable valve means shiftable therein for controlling the above-mentioned flow of supply and exhaust fluid relative to the cylinders 295 and 296 through the passages 304 and 305.

The shiftable valve means of the valve unit 306 includes an actuating stem 307 projecting from the unit and connected with a valve-actuating yoke 308 as by a threaded connection 309. The valve unit 306 is suitably connected with the main portion of the housing 287 as by means of connecting screws 310. The valve actuating yoke 308 is thereby located in a position directly above the piston-connecting yoke 299 so that the valve-actuating yoke and the piston-connecting yoke are shiftable along parallel paths.

At a point between the piston yoke 299 and the valve-actuating yoke 308, the housing 287 is provided with a connecting slot 312 connecting the guideways in which these two yokes operate. The piston yoke 299 is provided with a longitudinal slot 313 facing the housing slot 312, and the valve-actuating yoke 308 is provided with a recess 314 which likewise faces the housing slot 312. In addition, the valve yoke 308 is provided with a longitudinal second slot 315 extending through one of the side walls of the recess 314.

A motion-transmitting sector-shaped link 316 is provided in the housing slot 312 and is swingable on a pivot pin 317 mounted in the valve unit 306. The link 316 operates as a snap-action member for transmitting actuating movement from the piston yoke 299 to the valve yoke 308, as will be presently described.

The lower end of the link 316 extends into the slot 313 of the piston yoke 299 and has a forked portion providing spaced fork arms 319 and 320 which straddle a thrust pin 321 mounted in the piston yoke and extending transversely of the slot thereof. The upper end of the link 316 extends into the recess 314 of the valve yoke 308 and carries a transverse valve-actuating pin 322 which extends through the slot 315 of the valve yoke into an adjacent spring chamber 323. The spring chamber is formed in the housing 287 so as to extend into the valve unit 306 and is located in an offset relation from the housing slot 312. A tension spring 324 located in the spring chamber 323 has the upper end thereof secured on the pin 322 of the link 316 and has its lower end attached to an anchor pin 325 mounted in the housing 287.

The location of the shiftable pins 321 and 322 relative to the pivot pin 317 and the spring anchorage pin 325 is such that, when the pin 322 moves across a vertical center line passing through the axes of the pivot pin 317 and the anchor pin 325, the spring 324 will produce a snap action by which the link 316 will be suddenly swung on the pivot pin 317 to cause the pin 322 to engage one end or the other of the valve yoke slot 315, depending on the direction in which the link has been swung, to thereby automatically shift the valve of the valve unit 306 causing the same to function as a reversing valve for the fluid being supplied to the cylinders 295 and 296. It will thus be seen that as long as pressure fluid for the cylinders 295 and 296 is supplied thereto through the valve unit 306, the pistons 297 and 298 will be reciprocated to cause the rack and pinion members 300 and 301 to oscillate the drive shaft 294 for swinging the actuating arm 289.

The oscillating movements of the drive shaft 294 are transmitted to the actuating arm 289 through an adjustable eccentric-type of drive connection 326 by which this shaft is connected to the actuating arm and which connection comprises co-operating slot and block elements 327 and 328. The slot 327 is a transverse slot in a cylindrical drum portion 329 of the drive shaft 294 and the block 328 is adjustably slidable in the slot for varying the eccentricity of the drive connection 326. The block 328 is formed as a head of a combined clamping bolt and crank pin 330 on which the actuating arm 289 is mounted. The shaft 294 is provided with a suitable packing 318 which extends therearound at a point between the bearing 293 and the drum porton 329.

The block 328 is retained in the slot 327 by the body portion of a first adjusting arm 331 which overlies the slot and is secured on the drum portion 329 by screws 332. This first adjusting arm 331 has a clearance opening 333 therein for the pin 330 and lies alongside of a second adjusting arm 334. The position of the block 328 in the slot 327 is shiftable by relative swinging movement between the first and second adjusting arms 331 and 334, as will be presently explained, and normally the position of the block is such that the axis 335 of the pin 330 is offset from the axis 336 of the drive shaft 294 as shown in FIGS. 17 and 18.

The stem of the pin 330 projects outwardly from the second adjusting arm 334 so as to extend through a combined spacer and bearing support sleeve 337 and a cover disk 338 and has a clamping nut 339 on the threaded outer end thereof. The actuating arm 289 includes side plates in the form of disks 341 and 342 lying on opposite sides thereof and secured thereto by screws 343, and is supported by an antifriction bearing 344 mounted on the sleeve 337 at a point between a pair of packings 345.

From the construction of the drive connection 326 and the mounting of the actuating arm 289 as described above, it will accordingly be seen that when the nut 339 is in a loosened condition the second adjusting arm 334 can be swung relative to the first adjusting arm 331 to thereby shift the block 327 to the desired position along the slot 328 to provide the eccentricity needed between the axes 335 and 336 to produce the desired swinging movement of the actuating arm 289 in response to the oscillation imparted to the drive shaft 294 by the power device 286. When the desired setting of the block 327 has been made, the nut 339 is tightened so as to co-operate with the block in clamping therebetween the adjusting arms 331 and 334, the sleeve 337, and the cover disk 338 without applying clamping pressure to the actuating lever 289. The pin 330 then serves as an eccentric crank pin projection of the shaft 294 on which the actuating lever 289 is pivoted by the bearing 344.

The relative swinging movement between the adjusting arms 331 and 334 is produced by a rotatable eccentric adjusting pin 350 having its stem portion 351 pivotally mounted in a boss 352 of the adjusting arm 331 and its eccentric head portion 353 rotatable in an opening 354 of the adjusting arm 334. Thus by rotation of the eccentric pin 350, while the nut 339 is in a loosened condition, relative swinging is produced between the adjusting arms to locate the block 327 at a setting in the slot 328 to provide the desired eccentricity for the crank pin 330.

A large value of eccentricity between the axes 335 and 336 will produce a greater extent of swinging movement of the actuating arm 289 and a smaller value of eccentricity will result in a smaller extent of swinging movement. When the eccentricity is of zero value, no swinging movement at all will be imparted to the actuating arm 289 and the oscillations of the shaft 294 will merely be an idle movement. The eccentric pin 350 can be locked in the desired position of adjustment by a suitable set screw 355.

As shown in FIGS. 16 and 17, the adjusting arms 331 and 334 preferably have indicator arm projections 357 and 358 thereon and which move relative to each other corresponding with the swinging movement produced between the adjusting arms by the eccentric pin 350. The indicator arm 357 is provided with a graduated scale 359 and the indicator arm 358 has a beveled edge 360 by which readings can be taken from the graduated scale as indications of the eccentricity of the crank pin 330.

During the operation of the machine 15 when equipped with the modified workholder unit 285 of FIGS. 16 to 19 inclusive, the gear member 26$^a$ is rotatably driven by the tool member 21 while the brake device 213 acts as a drag on the gear member and, at the same time, the above-described vibrator and traverse mechanisms 45 and 46 impart a rapid short-stroke vibratory movement to the gear member and a concurrent back-and-forth axial traverse movement. While these rotative, vibratory and traverse movements are being imparted to the gear member 26$^a$, the power device 286 of the modified workholder unit 285 operates to impart back-and-forth swinging to the gear member 26$^a$ through the workholder head 157$^a$ in a direction transverse to the translatory swinging movement by which the gear member is moved into mesh with the tool member. This transverse swinging movement produces the above-mentioned desired crowning action on the gear member 26$^a$ during the abrasive finishing thereof.

From the accompanying drawings and the foregoing detailed description it will now be readily understood that this invention has provided a novel gear finishing machine capable of a large output of abrasively finished gear members and accomplishes the finishing of such gear members in an efficient and accurate manner with a minimum amount of attention on the part of a machine operator.

Although the gear finishing apparatus of this invention has been illustrated and described herein to a somewhat detailed extent it will be understood, of course, that the invention is not to be regarded as being limited correspondingly in scope but includes all changes and modifications coming within the terms of the claims hereof.

Having described my invention, I claim:

1. In gear finishing apparatus; a frame means; workholder means on said frame means and adapted to rotatably support a gear member to be finished; a rotatable gear-shaped tool member adapted for meshed engagement with said gear member and to drive the same; means providing for an abrasive condition between the meshed portions of said members; rotatably driven tool spindle means supported by said frame means and having said tool member connected therewith for rotation thereby; vibrator means effective through said tool spindle means for vibrating said tool member; and traverse mechanism effective through said tool spindle means for causing an axial traverse movement of said tool member during the rotative and vibratory movements thereof.

2. In gear finishing apparatus; a frame means; workholder means on said frame means and adapted to rotatably support a gear member to be finished; a rotatable gear-shaped tool member adapted for meshed engagement with said gear member and to drive the same; means providing for an abrasive condition between the meshed portions of said members; rotatably driven tool spindle means supported by said frame means and having said tool member connected therewith for rotation thereby; and power means connected with said tool spindle means comprising a combined traverse mechanism and vibrator means effective through said tool spindle means for causing axial traversing movement and axial vibration of said tool member in an out-of-phase relation to the rotative movement thereof.

3. In gear finishing apparatus; a frame means; workholder means on said frame means and adapted to rotatably support a gear member to be finished; a rotatable gear-shaped tool member adapted for meshed engagement with said gear member and to drive the same; means providing for an abrasive condition between the meshed portions of said members; rotatably driven tool spindle means supported by said frame means and having said tool member connected therewith for rotation thereby; fluid pressure responsive means effective through said tool spindle means for vibrating said tool member and imparting an axial traverse movement thereto and including a control valve means; and traverse control mechanism operably connected with said control valve means.

4. In gear finishing apparatus; a frame means; workholder means on said frame means and adapted to rotatably support a gear member to be finished; a rotatable gear-shaped tool member adapted for meshed engagement with said gear member and to drive the same; means providing an abrasive condition between the meshed portions of said members; rotatably driven tool spindle means supported by said frame means and having said tool member connected therewith for rotation thereby; fluid pressure responsive means connected with said tool spindle means and coaxial therewith; valve means controlling said fluid pressure responsive means for causing the latter to vibrate said tool member and to also impart an axial traverse movement thereto; and cyclically operable traverse control mechanism connected with said valve means to actuate the same for causing said traverse movement in an out-of-phase relation to the vibratory movement.

5. In gear finishing apparatus; a frame means having cylinder means thereon; tool spindle means coaxial with said cylinder means; a rotatable gear-shaped tool member on said tool spindle means; driving means effective to rotate said tool member; workholder means adapted to support a gear member in meshed engagement with said tool member; means providing an abrasive condition between the meshed portions of said members; piston means connected with said tool spindle means and reciprocable in said cylinder means; fluid pressure supply means connected with said cylinder means including valve means coaxial with said tool spindle means and comprising co-operating valve members; one of said valve members being automatically shiftable by the action of the pressure fluid for causing a vibratory axial movement of said tool member by said piston means, and another being shiftable to cause an axial traverse movement of said tool member by said piston means; and means connected with said other valve member for shifting the same.

6. Gear finishing apparatus as defined in claim 5 wherein said piston means has a valve body connected therewith and said valve members are located in said valve body; said one valve member comprising a valve sleeve reciprocably shiftable in said valve body, and said other valve member comprising a valve plunger shiftable in said valve sleeve.

7. In gear finishing apparatus of the kind comprising frame means having workholder means thereon adapted to rotatably support a gear member in mesh with a rotatable gear-shaped tool member to be driven and abradingly finished by the latter; cylinder means on said frame means; piston means reciprocable in said cylinder means; tool spindle means rotatable in said frame means and connecting said piston means with said tool member; drive means connected with said spindle means for rotating said tool member; pressure fluid supply means connected with said cylinder means and including valve means operable to cause actuation of said piston means for imparting axial movements to said tool member; said valve means comprising co-operating valve members one of which is automatically shiftable by the action of the pressure fluid for causing a vibratory axial movement of said tool member by said piston means, and another of which is shiftable to cause an axial traverse movement of said tool member by said piston means; and traverse control mechanism connected with said other valve member to shift the same.

8. In gear finishing apparatus; a frame means; workholder means on said frame means and adapted to rotatably support a gear member to be finished; a rotatable gear-shaped tool member adapted for meshed engagement with said gear member and to drive the same; means providing for an abrasive condition between the meshed portions of said members; rotatably driven tool spindle means supported by said frame means and having said tool member connected therewith for rotation thereby; fluid pressure responsive means effective through said tool spindle means for vibrating said tool member and comprising cylinder means on said frame means, and piston means operable in said cylinder means and connected with said tool spindle means; valve means controlling said fluid pressure responsive means for causing the latter to vibrate said tool member and to also impart an axial traverse movement thereto; said piston means being movable in one direction by the pressure fluid; spring means effective to move said piston means in the opposite direction; and traverse control mechanism connected with said valve means for imparting actuating movement thereto.

9. In gear finishing apparatus; a frame means; workholder means on said frame means and adapted to rotatably support a gear member to be finished; a rotatable gear-shaped tool member adapted for meshed engagement with said gear member and to drive the same; means providing for an abrasive condition between the meshed portions of said members; rotatably driven tool spindle means supported by said frame means and having said tool member connected therewith for rotation thereby; vibrator means effective through said tool spindle means for vibrating said tool member during the rotative movement thereof; said workholder means comprising rockable means pivotally supported by said frame means, and rotatable work spindle means supported by said rockable means in an offset relation to the pivot axis of the latter and swingable by said rockable means for moving the gear member into and out of said meshed engagement; and actuating means comprising a power device connected with said rockable means for rocking the same and for retaining said rockable means in a position with said gear member in said meshed engagement.

10. In gear finishing apparatus; a frame means; workholder means on said frame means and adapted to rotatably support a gear member to be finished; a rotatable gear-shaped tool member adapted for meshed engagement with said gear member and to drive the same; means providing for an abrasive condition between the meshed portions of said members; rotatably driven tool spindle means supported by said frame means and having said tool member connected therewith for rotation thereby; traverse mechanism effective through said tool spindle means for imparting an axial traverse movement to said tool member; vibrator means effective through said tool spindle means for vibrating said tool member during the rotative and traverse movements thereof; said workholder means comprising rockable means pivotally supported by said frame means, and rotatable work spindle means supported by said rockable means in an offset relation to the pivot axis of the latter and swingable by said rockable means for moving the gear member into and out of said meshed engagement; and actuating means comprising a power device connected with said rockable means for rocking the same and for retaining said rockable means in a position with said gear member in said meshed engagement.

11. In gear finishing apparatus; a frame means; workholder means on said frame means and adapted to rotatably support a gear member to be finished; a rotatable gear-shaped tool member adapted for meshed engagement by said gear member and to drive the latter; means providing for an abrasive condition between the meshed portions of said members; rotatably driven tool spindle means supported by said frame means and having said tool member connected therewith for rotation thereby; vibrator means effective through said tool spindle means for vibrating said tool member during the rotative movement thereof; said workholder means comprising rockable means pivotally supported by said frame means and including a head and work spindle means rotatable in said head on a rotation axis offset from the pivot axis of said rockable means; said head being swingable in opposite directions along a first path of swinging movement by rocking of said rockable means for moving the gear member into and out of said meshed engagement; actuating means connected with said rockable means for rocking the same; and means connecting said head with said rockable means and providing for movement of said head along a second path of movement extending transverse to said first path for varying said meshed engagement of the gear member with said tool member.

12. In gear finishing apparatus; a frame means; rotatable tool spindle means supported by said frame means and having a gear-shaped tool member connected therewith; a support head; pivot means connecting said support head with said frame means for rocking of the head about a pivot axis spaced from the axis of said tool spindle means; a workholder head having work spindle means rotatable therein on a rotation axis offset from said pivot axis and adapted for mounting of a gear member thereon; connecting means connecting said workholder head with said support head including adjusting means providing for adjusting movement of said work spindle means toward and away from said tool spindle means; actuating means connected with said support head to rock the same for swinging said gear member into and out of meshed engagement with said tool member; and means providing for an abrasive condition between the meshed portions of said gear member and tool member.

13. In gear finishing apparatus; a frame means; rotatable tool spindle means supported by said frame means and having a gear-shaped tool member connected therewith; a support head; pivot means connecting said support head with said frame means for rocking of the head about a pivot axis spaced from the axis of said tool spindle means; a workholder head having work spindle means rotatable therein on a rotation axis offset from said pivot axis and adapted for mounting of a gear member thereon; connecting means connecting said workholder head with said support head including adjusting means providing for adjusting movement of said work spindle means toward and away from said tool spindle means; actuating means connected with said support head to rock the same for swinging said gear member into and out of meshed engagement with said tool member; means providing for an abrasive condition between the meshed portions of said gear member and tool member; vibrator means connected with tool spindle means for imparting a rapid axial vibratory movement to said tool member; and traverse mechanism connected with said tool spindle means for producing an axial traverse movement of said tool member in an out-of-phase relation to the vibratory movement thereof.

14. In gear finishing apparatus; a frame means; rotatable tool spindle means supported by said frame means and having a gear-shaped tool member connected therewith; a support head; pivot means connecting said support head with said frame means for rocking of the head about a pivot axis spaced from the axis of said tool spindle means; a workholder head having work spindle means rotatable therein on a rotation axis offset from said pivot axis and adapted for mounting of a gear member thereon; connecting means connecting said workholder head with said support head including adjusting means providing for adjusting movement of said work spindle means toward and away from said tool spindle means; actuating means connecting with said support head to rock the same for swinging said gear member into and out of meshed engagement with said tool member; means providing for an abrasive condition between the meshed portions of said gear member and tool member; chuck means on said work spindle means for releasably holding said gear member; and a power device in said workholder head for causing actuation of said chuck means.

15. In gear finishing apparatus; a frame means; rotatable tool spindle means supported by said frame means and having a gear-shaped tool member connected therewith; a support head; pivot means connecting said support head with said frame means for rocking of the head about a pivot axis spaced from the axis of said tool spindle means; a workholder head having work spindle means rotatable therein on a rotation axis offset from said pivot axis and adapted for mounting of a gear member thereon; connecting means connecting said workholder head with said support head including adjusting means providing for adjusting movement of said work spindle means toward and away from said tool spindle means; actuating means connected with said support head to rock the same for swinging said gear member into and out of meshed engagement with said tool member; means providing for an abrasive condition between the meshed portions of said gear member and tool member; and power-actuated brake means in said workholder head and effective on said work spindle means for retarding rotation of said gear member.

16. In gear finishing apparatus; a frame means; rotatable tool spindle means supported by said frame means and having a gear-shaped tool member connected therewith; rockable means pivoted on said frame means including a support head having a guide means thereon; a workholder head having work spindle means rotatable therein on a rotation axis offset from the pivot axis of said rockable means and adapted for mounting of a gear member thereon; means connecting said workholder head with said support head including slide means cooperable with said guide means; actuating means connected with said rockable means to rock the same for swinging said workholder head to thereby move said gear member into and out of meshed engagement with said tool member; and means providing for an abrasive condition between the meshed portions of said gear member and tool member; the location of said guide means and the co-operation of said slide means therewith providing for a translatory movement of said work spindle means relative to said tool spindle means.

17. Gear finishing apparatus as defined in claim 16 and comprising means pivotally connecting said workholder head with said slide means and providing for a second swinging movement of said workholder head along a path extending transverse to the path of the first-mentioned swinging of said workholder head.

18. In gear finishing apparatus; a frame means; rotatable tool spindle means supported by said frame means and having a gear-shaped tool member connected therewith; rockable means pivoted on said frame means including a support head having a guide means thereon; a workholder head having work spindle means rotatable therein on a pivot axis offset from the pivot axis of said rockable means and adapted for mounting of a gear member thereon; slide means supporting said workholder head and being movable along said guide means for producing a translatory adjusting movement of said work spindle means toward and away from said tool spindle means; pivot means connecting said workholder with said slide means; means effective to secure said slide means in the adjusted position; eccentric adjusting means spaced from said pivot means and effective to adjustably tilt said work spindle means relative to said tool spindle means; said rockable means being rockable for swinging said gear member into meshed engagement with said tool member without disturbing the translatory and tilting adjustments of the work spindle means; and means providing for an abrasive condition between the meshed portions of said gear and tool members.

19. In gear finishing apparatus; a frame means; rotatable tool spindle means supported by said frame means and having a gear-shaped tool member connected therewith; rockable means pivoted on said frame means including a support head having a guide means thereon; a workholder head having work spindle means rotatable therein on a rotation axis offset from the pivot axis of said rockable means and adapted for mounting of a gear member thereon; slide means supporting said workholder head and being movable along said guide means for producing a translatory adjusting movement of said work spindle means toward and away from said tool spindle means; pivot means connecting said workholder head with said slide means; means effective to secure said slide means in the adjusted position; eccentric adjusting means spaced from said pivot means and effective to adjustably tilt said work spindle means relative to said tool spindle means; said rockable means being rockable for swinging said gear member into meshed engagement with said tool member without disturbing the translatory and tilting adjustments of the work spindle means; and means providing for an abrasive condition between the meshed portions of said gear and tool members; a power device connected with said rockable means for rocking the same in a direction to produce the meshed engagement of said gear member with said tool member; and spring means effective on said rockable means and operable to rock the same in a direction to disengage the gear member from said tool member whenever said power device is ineffective.

20. In gear finishing apparatus; a frame structure; tool spindle means mounted on said structure and having a gear-shaped tool member rotatably supported thereby; drive means connected with said tool member to rotate the same; workholder means including work spindle means adapted to rotatably support a gear member; pivot means connecting said workholder means with said structure for swinging on a pivot axis parallel to and spaced from the axis of said tool spindle means and with said work spindle means offset toward said tool spindle means; actuating means connected with said workholder means for swinging the same on said pivot axis to advance said gear member substantially in the plane of said tool member into meshed engagement with the latter; means for producing an abrasive condition between the meshed portions of said gear and tool members; and stop means effective to limit said swinging of the workholder means when said gear member is in said meshed engagement.

21. In gear finishing apparatus; a frame structure; tool spindle means mounted on said structure and having a gear-shaped tool member rotatably supported thereby; drive means connected with said tool member to rotate the same; workholder means including work spindle means adapted to rotatably support a gear member; pivot means connecting said workholder means with said structure for swinging on a pivot axis parallel to and spaced from the axis of said tool spindle means and with said work spindle means offset toward said tool spindle means; actuating means connected with said workholder means for swinging the same on said pivot axis to advance said gear member substantially in the plane of said tool member into meshed engagement with the latter; means for producing an abrasive condition between the meshed portions of said gear and tool members; stop means effective to limit said swinging of the workholder means when said gear member arrives at the position of said meshed engagement; said actuating means comprising a power device energizable to produce said swinging of said workholder means in a direction to cause said meshed engagement; and spring means acting to swing said workholder means in the opposite direction to disengage the gear member from said tool member upon de-energization of said power device.

22. In gear finishing apparatus; a frame structure; tool spindle means mounted on said structure and rotatably supporting a gear-shaped tool member; drive means operable to rotate said tool member; support heads located at spaced points around the tool spindle axis and mounted on said structure for swinging on pivot axes extending parallel to and spaced from said tool spindle axis; workholder heads connected with said support heads in an offset relation to said pivot axes and provided with work spindles adapted to support gear members to be finished for rotation on axes extending parallel to said tool spindle axis power devices connected with said support heads and being energizable to swing the same for advancing the gear members substantially in the plane of said tool member and into meshed engagement with the latter; and means providing an abrasive condition between the meshed portions of said tool and gear members.

23. In gear finishing apparatus; a frame means; tool spindle means mounted on said frame means and rotatably supporting a gear-shaped tool member; drive means operable to rotate said tool member; rockable means pivoted on said frame means for rocking on a pivot axis spaced from the rotation axis of said tool member; work spindle means rotatably supported by said rockable means and adapted to have a gear member mounted thereon; said work spindle means being offset from said pivot axis for swinging of said gear member into and out of meshed engagement with said tool member by the rocking of said rockable means; means providing for an abrasive condition between the meshed portions of said gear and tool members; and brake means effective to retard rotation of said gear member.

24. In gear finishing apparatus; a frame structure; tool spindle means mounted on said structure and rotatably supporting a gear-shaped tool member; drive means effective to rotate said tool member; a support head pivoted on said structure for rocking on a pivot axis spaced from the rotation axis of said tool member; a workholder head offset from said support head; work spindle means mounted in said workholder head and adapted to support a gear member for rotation and for swinging along a first path of swinging movement into and out of meshed engagement with said tool member by the rocking of said support head; means providing for an abrasive condition between the meshed portions of said gear and tool members; connecting means swingably connecting said workholder head with said support head for swinging of said work spindle means along a second path of swinging movement extending transverse to said first path; and a power device operably connected with said workholder head for causing the swinging movement of said work spindle means along said second path.

25. Gear finishing apparatus as defined in claim 24 wherein said connecting means comprises pivot means for the second mentioned swinging movement and having a pivot axis extending transverse to said rotation axis and lying between parallel planes extending perpendicular to said rotation axis and spaced apart a distance equal to the axial thickness of the toothed portion of said tool member.

26. In gear finishing apparatus; a frame structure; tool spindle means mounted on said structure and rotatably supporting a gear-shaped tool member; drive means effective to rotate said tool member; a support head pivoted on said structure for rocking on a pivot axis spaced from the rotation axis of said tool member; a workholder head offset from said support head; work spindle means mounted in said workholder head and adapted to support a gear member for rotation and for swinging along a first path of swinging movement into and out of meshed engagement with said tool member by the rocking of said support head; means providing for an abrasive condition between the meshed portions of said gear and tool members; connecting means swingably connecting said workholder head with said support head for back-and-forth swinging strokes of said work spindle means along a second path of swinging movement extending transverse to said first path; a power device operably connected with said workholder head for causing the swinging movement of said work spindle means along said second path; and adjusting means of the eccentric type operably effective on said connecting means for varying the stroke length of the swinging of said work spindle means along said second path.

27. In gear finishing apparatus; a frame structure; tool spindle means mounted on said structure and rotatably supporting a gear-shaped tool member; drive means effective to rotate said tool member; a support head pivoted on said structure for rocking on a pivot axis spaced from the rotation axis of said tool member and having guide means thereon; a workholder head offset from said support head; work spindle means mounted in said workholder head and adapted to support a gear member for rotation and for swinging along a first path of swinging movement into and out of meshed engagement with said tool member by the rocking of said support head; means providing for an abrasive condition between said gear and tool members; slide means; connecting means swingably connecting said workholder head with said slide means for swinging of said work spindle means along a second path of swinging movement extending transverse to said first path; said slide means being adjustably movable along said guide means for shifting said workholder head relative to said tool spindle means to vary the depth of said meshed engagement; holding means effective on said slide means to retain the same in the adjusted position; and a power device operably connected with said workholder head for causing the swinging movement of said work spindle means along said second path.

28. In gear finishing apparatus; a frame means; workholder means on said frame means and adapted to rotatably support a gear member to be finished; a rotatable gear-shaped tool member adapted for meshed engagement with said gear member and to drive the same; means providing for an abrasive condition between the meshed portions of said members; rotatably driven tool spindle means supported by said frame means and having said tool member connected therewith for rotation thereby; reciprocable means connected with said tool spindle; means for causing said last named means to vibrate said tool member and to also impart an axial traverse movement thereto during the vibratory and rotative movements thereof.

References Cited in the file of this patent
UNITED STATES PATENTS

| | | |
|---|---|---|
| 1,682,420 | Rolf | Aug. 28, 1928 |
| 1,808,401 | Cook et al. | June 2, 1931 |
| 1,917,178 | Wolfe | July 4, 1933 |
| 1,948,071 | Hoffmann et al. | Feb. 20, 1934 |
| 2,351,842 | Seibold | June 20, 1944 |
| 2,385,129 | Davis | Sept. 18, 1945 |
| 2,439,303 | Indge | Apr. 6, 1948 |
| 2,913,858 | Praeg et al. | Nov. 24, 1959 |
| 2,977,726 | Daniel | Apr. 4, 1961 |

OTHER REFERENCES

Publication: "Machine Design," March 1954, pages 153 and 154. (Copy in Div. 12.)